(12) United States Patent
Dubin et al.

(10) Patent No.: US 10,282,068 B2
(45) Date of Patent: May 7, 2019

(54) GAME EVENT DISPLAY WITH A SCROLLABLE GRAPHICAL GAME PLAY FEED

(71) Applicant: VenueNext, Inc., Santa Clara, CA (US)

(72) Inventors: Jonathan Dubin, San Francisco, CA (US); Kunaldeep Malik, Palo Alto, CA (US); Gideon Yu, Hillsborough, CA (US); Paraag Marathe, Menlo Park, CA (US); Doug Garland, Palo Alto, CA (US); Mitch Huang, Palo Alto, CA (US); Chris Giles, Santa Clara, CA (US); Martin Manville, San Jose, CA (US); Mark Kilgore, San Francisco, CA (US); Patrick Weiss, San Francisco, CA (US)

(73) Assignee: VENUENEXT, INC., Santa Clara, CA (US)

( * ) Notice: Subject to any disclaimer, the term of this patent is extended or adjusted under 35 U.S.C. 154(b) by 0 days.

(21) Appl. No.: 14/011,659

(22) Filed: Aug. 27, 2013

(65) Prior Publication Data

US 2015/0058730 A1    Feb. 26, 2015

Related U.S. Application Data

(60) Provisional application No. 61/870,182, filed on Aug. 26, 2013.

(51) Int. Cl.
*G06F 3/0482* (2013.01)
*G06F 3/0484* (2013.01)
(Continued)

(52) U.S. Cl.
CPC ........ *G06F 3/04842* (2013.01); *A63F 13/327* (2014.09); *A63F 13/65* (2014.09);
(Continued)

(58) Field of Classification Search
CPC .............................. G06F 3/048; G06F 3/0482
See application file for complete search history.

(56) References Cited

U.S. PATENT DOCUMENTS 4,292,507 A      9/1981   Hovorka
5,371,846 A  *  12/1994   Bates ................... G06F 3/04855
                                                   345/684

(Continued)

OTHER PUBLICATIONS

Nessman, "ESPN Gamecast a Sweet Way to Keep Up With a Game," Jan. 23, 2012, http://kfmx.com/espn-gamecast-a-sweet-way-to-keep-up-with-a-game/.*

(Continued)

*Primary Examiner* — Ryan Barrett
(74) *Attorney, Agent, or Firm* — Hickman Palermo Becker Bingham LLP

(57) ABSTRACT

A method is disclosed for receiving a plurality of play events associated with a sporting event, wherein each play event of the plurality of play events comprises a game clock time, a description, and identifies a sports team of a plurality of sports teams; for each play event in the plurality of play events: generating a graphical tile that is associated with the play event; configuring an appearance of the graphical tile based, at least in part, on the description and the sports team of the play event; causing to display a graphical tile list in a graphical user interface of a mobile computing device, wherein the graphical tile list includes one or more of the graphical tiles listed in a chronological order based on the game clock time in the play event associated with each graphical tile.

28 Claims, 14 Drawing Sheets

(51) Int. Cl.
  *G06F 17/30* (2006.01)
  *A63F 13/65* (2014.01)
  *A63F 13/327* (2014.01)
  *G06F 3/0485* (2013.01)
(52) U.S. Cl.
  CPC .......... *G06F 3/0482* (2013.01); *G06F 3/0485* (2013.01); *G06F 17/30044* (2013.01)

(56) References Cited

U.S. PATENT DOCUMENTS

| | | | |
|---|---|---|---|
| 5,527,033 A | 6/1996 | Puma | |
| 5,557,717 A * | 9/1996 | Wayner | 700/92 |
| 5,636,920 A * | 6/1997 | Shur et al. | 700/91 |
| 5,903,267 A * | 5/1999 | Fisher | G06F 3/04855 345/157 |
| 6,144,375 A * | 11/2000 | Jain et al. | 715/251 |
| 6,452,609 B1 | 9/2002 | Katinsky et al. | 715/716 |
| 6,486,896 B1 * | 11/2002 | Ubillos | G06F 3/04855 715/781 |
| 6,545,689 B1 * | 4/2003 | Tunli | 715/719 |
| 6,631,522 B1 * | 10/2003 | Erdelyi | 725/53 |
| 6,681,398 B1 | 1/2004 | Verna | |
| 6,795,638 B1 * | 9/2004 | Skelley, Jr. | 386/281 |
| 6,977,667 B1 * | 12/2005 | Burke | 715/723 |
| 7,055,104 B1 | 5/2006 | Billmaier et al. | |
| 7,110,955 B1 * | 9/2006 | Barhnart et al. | 705/3 |
| 7,689,928 B1 * | 3/2010 | Gilra | G06F 3/04855 715/786 |
| 7,765,491 B1 * | 7/2010 | Cotterill | G06F 3/04847 345/156 |
| 7,791,607 B1 * | 9/2010 | Hughes et al. | 345/473 |
| 8,214,741 B2 | 7/2012 | Errico et al. | 715/719 |
| 8,358,345 B1 * | 1/2013 | Fiore et al. | 348/157 |
| 8,612,534 B1 * | 12/2013 | Hossack | H04L 51/04 709/206 |
| 8,634,708 B2 * | 1/2014 | Chevallier et al. | 386/343 |
| 9,032,296 B1 | 5/2015 | Jeffs | |
| 9,330,726 B1 | 5/2016 | Lawson | |
| 2002/0012526 A1 * | 1/2002 | Sai et al. | 386/69 |
| 2002/0040253 A1 * | 4/2002 | McNally et al. | 700/91 |
| 2002/0040482 A1 | 4/2002 | Sextro | |
| 2002/0145631 A1 * | 10/2002 | Arbab | G06F 3/04855 715/786 |
| 2002/0186252 A1 * | 12/2002 | Himmel | G06F 3/04855 715/787 |
| 2002/0191952 A1 * | 12/2002 | Fiore et al. | 386/46 |
| 2003/0001880 A1 * | 1/2003 | Holtz et al. | 345/716 |
| 2003/0063125 A1 * | 4/2003 | Miyajima et al. | 345/716 |
| 2003/0074373 A1 * | 4/2003 | Kaburagi et al. | 707/104.1 |
| 2003/0090504 A1 * | 5/2003 | Brook et al. | 345/716 |
| 2003/0137531 A1 * | 7/2003 | Katinsky et al. | 345/716 |
| 2004/0008225 A1 * | 1/2004 | Campbell | 345/764 |
| 2004/0056879 A1 * | 3/2004 | Erdelyi | 345/716 |
| 2004/0070594 A1 * | 4/2004 | Burke | 345/716 |
| 2004/0095377 A1 * | 5/2004 | Salandro | 345/723 |
| 2004/0205698 A1 | 10/2004 | Schliesmann | |
| 2004/0226012 A1 * | 11/2004 | Awada et al. | 718/100 |
| 2005/0005308 A1 * | 1/2005 | Logan et al. | 725/135 |
| 2005/0091604 A1 * | 4/2005 | Davis | G06F 3/0482 715/772 |
| 2005/0204294 A1 * | 9/2005 | Burke | 715/739 |
| 2005/0210410 A1 * | 9/2005 | Ohwa et al. | 715/821 |
| 2006/0036942 A1 * | 2/2006 | Carter | G06F 3/0485 715/273 |
| 2006/0170760 A1 | 8/2006 | Anderson | |
| 2006/0277460 A1 * | 12/2006 | Forstall et al. | 715/513 |
| 2006/0277481 A1 * | 12/2006 | Forstall et al. | 715/764 |
| 2007/0118608 A1 | 5/2007 | Egli | |
| 2007/0168543 A1 * | 7/2007 | Krikorian et al. | 709/231 |
| 2007/0186183 A1 * | 8/2007 | Hudson, Jr. | G06F 3/0482 715/810 |
| 2007/0209018 A1 * | 9/2007 | Lindemann | 715/784 |
| 2007/0245238 A1 | 10/2007 | Fugitt | |
| 2007/0247462 A1 * | 10/2007 | Bell | G06T 11/20 345/440 |
| 2007/0300157 A1 * | 12/2007 | Clausi et al. | 715/719 |
| 2008/0034316 A1 * | 2/2008 | Thoresson | G06F 3/04855 715/781 |
| 2008/0060001 A1 * | 3/2008 | Logan et al. | 725/34 |
| 2008/0066011 A1 | 3/2008 | Urrabazo et al. | |
| 2008/0066111 A1 * | 3/2008 | Ellis et al. | 725/57 |
| 2008/0082922 A1 * | 4/2008 | Biniak et al. | 715/719 |
| 2008/0086688 A1 * | 4/2008 | Chandratillake et al. | 715/719 |
| 2008/0086755 A1 | 4/2008 | Darnell et al. | |
| 2008/0134033 A1 * | 6/2008 | Burns | G06F 17/30864 715/705 |
| 2008/0172615 A1 * | 7/2008 | Igelman et al. | 715/719 |
| 2008/0238615 A1 * | 10/2008 | Carpenter | 340/5.91 |
| 2008/0244453 A1 | 10/2008 | Cafer | |
| 2008/0244456 A1 | 10/2008 | Shimizu | |
| 2008/0305870 A1 * | 12/2008 | Henderson | 463/31 |
| 2009/0064188 A1 | 3/2009 | Ospalik et al. | |
| 2009/0070407 A1 * | 3/2009 | Castle et al. | 709/203 |
| 2009/0124193 A1 | 5/2009 | Mitzel | |
| 2009/0132924 A1 * | 5/2009 | Vasa et al. | 715/723 |
| 2009/0143007 A1 * | 6/2009 | Terlizzi | 455/3.06 |
| 2009/0158192 A1 * | 6/2009 | De Peuter | G06F 3/0482 715/776 |
| 2009/0164569 A1 | 6/2009 | Garcia | |
| 2009/0164902 A1 * | 6/2009 | Cohen et al. | 715/716 |
| 2009/0164904 A1 * | 6/2009 | Horowitz et al. | 715/723 |
| 2009/0288009 A1 * | 11/2009 | Dulaney | 715/719 |
| 2009/0290848 A1 | 11/2009 | Brown | |
| 2010/0005399 A1 * | 1/2010 | Friedman et al. | 715/752 |
| 2010/0026809 A1 | 2/2010 | Curry | |
| 2010/0035682 A1 * | 2/2010 | Gentile et al. | 463/30 |
| 2010/0050198 A1 * | 2/2010 | Mockry et al. | 725/1 |
| 2010/0077355 A1 * | 3/2010 | Belinsky et al. | 715/835 |
| 2010/0122280 A1 | 5/2010 | Sofos et al. | |
| 2010/0125866 A1 | 5/2010 | Sofos et al. | |
| 2010/0131886 A1 * | 5/2010 | Gannon | G06F 3/0485 715/786 |
| 2010/0251165 A1 * | 9/2010 | Williams | G06F 3/0482 715/784 |
| 2010/0251167 A1 * | 9/2010 | DeLuca | G06F 3/0485 715/786 |
| 2010/0278509 A1 | 11/2010 | Nagano | |
| 2010/0287154 A1 * | 11/2010 | Tee | G06F 3/0488 707/708 |
| 2010/0287473 A1 * | 11/2010 | Recesso et al. | 715/716 |
| 2010/0287592 A1 * | 11/2010 | Patten et al. | 725/59 |
| 2010/0299183 A1 * | 11/2010 | Fujioka | 705/10 |
| 2011/0013087 A1 * | 1/2011 | House et al. | 348/564 |
| 2011/0040760 A1 | 2/2011 | Fleischman | |
| 2011/0066943 A1 * | 3/2011 | Brillon et al. | 715/716 |
| 2011/0090402 A1 * | 4/2011 | Huntington et al. | 348/564 |
| 2011/0113348 A1 | 5/2011 | Twiss et al. | |
| 2011/0154200 A1 * | 6/2011 | Davis et al. | 715/716 |
| 2011/0169959 A1 * | 7/2011 | DeAngelis et al. | 348/157 |
| 2011/0173214 A1 | 7/2011 | Karim | |
| 2011/0246889 A1 * | 10/2011 | Moore | 715/719 |
| 2011/0291945 A1 * | 12/2011 | Ewing et al. | 345/173 |
| 2011/0316884 A1 * | 12/2011 | Giambalvo et al. | 345/660 |
| 2011/0321096 A1 | 12/2011 | Landow et al. | |
| 2012/0027379 A1 | 2/2012 | Thompson et al. | |
| 2012/0078667 A1 * | 3/2012 | Denker et al. | 705/5 |
| 2012/0087637 A1 * | 4/2012 | Logan et al. | 386/241 |
| 2012/0130741 A1 * | 5/2012 | Sparandara et al. | 705/3 |
| 2012/0131507 A1 | 5/2012 | Sparandara et al. | |
| 2012/0147022 A1 | 6/2012 | Roberts et al. | |
| 2012/0166955 A1 * | 6/2012 | Bender | 715/733 |
| 2012/0166964 A1 * | 6/2012 | Tseng | 715/745 |
| 2012/0179969 A1 * | 7/2012 | Lee et al. | 715/719 |
| 2012/0189273 A1 | 7/2012 | Folgner et al. | |
| 2012/0192121 A1 * | 7/2012 | Bonnat | 715/863 |
| 2012/0192227 A1 | 7/2012 | Fleischman | |
| 2012/0246567 A1 * | 9/2012 | Brahms et al. | 715/719 |
| 2012/0260211 A1 * | 10/2012 | Sathish et al. | 715/784 |
| 2012/0311447 A1 * | 12/2012 | Chisa et al. | 715/719 |
| 2012/0324357 A1 * | 12/2012 | Viegers et al. | 715/730 |
| 2013/0036369 A1 | 2/2013 | Mitchell et al. | |

(56) References Cited

U.S. PATENT DOCUMENTS

| | | | |
|---|---|---|---|
| 2013/0047085 A1 | 2/2013 | Roberts et al. | |
| 2013/0055128 A1* | 2/2013 | Muti et al. | 715/769 |
| 2013/0080968 A1* | 3/2013 | Hanson et al. | 715/783 |
| 2013/0086501 A1* | 4/2013 | Chow et al. | 715/772 |
| 2013/0095865 A1 | 4/2013 | Roets | |
| 2013/0095909 A1 | 4/2013 | O'Dea | |
| 2013/0132836 A1* | 5/2013 | Ortiz | 715/716 |
| 2013/0157735 A1 | 6/2013 | Amaitis et al. | |
| 2013/0178284 A1* | 7/2013 | Hughes et al. | 463/31 |
| 2013/0191752 A1* | 7/2013 | Lapierre et al. | 715/723 |
| 2013/0203494 A1 | 8/2013 | Coiner | |
| 2013/0227596 A1 | 8/2013 | Pettis et al. | |
| 2013/0275151 A1 | 10/2013 | Moore et al. | |
| 2013/0300937 A1 | 11/2013 | Williams et al. | |
| 2013/0316837 A1 | 11/2013 | Coiner, Jr. | |
| 2013/0321388 A1 | 12/2013 | Locke | |
| 2013/0324245 A1 | 12/2013 | Harvey | |
| 2014/0046802 A1* | 2/2014 | Hosein | G01R 1/06711 705/26.61 |
| 2014/0059491 A1* | 2/2014 | Kim | G06F 3/04817 715/835 |
| 2014/0081903 A1 | 3/2014 | Koosel | |
| 2014/0082506 A1* | 3/2014 | Maxwell et al. | 715/738 |
| 2014/0129559 A1 | 5/2014 | Estes | |
| 2014/0135956 A1 | 5/2014 | Thurman et al. | |
| 2014/0164972 A1 | 6/2014 | Lee | |
| 2014/0192204 A1 | 7/2014 | Glazer et al. | |
| 2014/0195918 A1* | 7/2014 | Friedlander | 715/727 |
| 2014/0213357 A1 | 7/2014 | Claffey | |
| 2014/0214983 A1* | 7/2014 | Hossack | H04L 51/04 709/206 |
| 2014/0245341 A1 | 8/2014 | Mack et al. | |
| 2014/0253431 A1* | 9/2014 | Gossweiler et al. | 345/156 |
| 2014/0258859 A1* | 9/2014 | Plumb | 715/716 |
| 2014/0279731 A1 | 9/2014 | Yakovenko | |
| 2014/0282745 A1* | 9/2014 | Chipman et al. | 725/61 |
| 2014/0337763 A1* | 11/2014 | Feldstein et al. | 715/753 |
| 2014/0364974 A1 | 12/2014 | Wohl | |
| 2014/0365432 A1 | 12/2014 | Jain et al. | |
| 2014/0365886 A1 | 12/2014 | Koenig | |
| 2015/0050988 A1 | 2/2015 | Nichols et al. | |
| 2015/0058780 A1* | 2/2015 | Malik et al. | 715/772 |
| 2015/0058781 A1* | 2/2015 | Malik et al. | 715/772 |
| 2015/0248917 A1* | 9/2015 | Chang | H04N 13/0011 386/282 |

OTHER PUBLICATIONS

Elliott, "The Symbology of the New Red Espn Gamecast Own Goal Icon," Oct. 12, 2011, http://www.futfanatico.com/2011/10/12/symbology-espn-gamecast-goal-icon/.*

U.S. Appl. No. 14/011,634, filed Aug. 27, 2013, Office Action, dated Dec. 17, 2013.
U.S. Appl. No. 14/011,634, filed Aug. 27, 2013, Office Action, dated May 21, 2014.
U.S. Appl. No. 14/011,669, filed Aug. 27, 2013, Advisory Action, dated Nov. 26, 2014.
U.S. Appl. No. 14/011,634, filed Aug. 27, 2013, Advisory Action, dated Dec. 16, 2014.
U.S. Appl. No. 14/011,669, filed Aug. 27, 2013, Final Office Action, dated Aug. 28, 2014.
U.S. Appl. No. 14/011,634, filed Aug. 27, 2013, Final Office Action, dated Aug. 27, 2014.
U.S. Appl. No. 14/576,021, filed Dec. 18, 2014, Office Action, dated Mar. 10, 2015.
U.S. Appl. No. 14/576,007, filed Dec. 18, 2014, Office Action, dated Apr. 29, 2015.
U.S. Appl. No. 14/576,007, filed Dec. 18, 2014, Final Office Action, dated Aug. 28, 2015.
U.S. Appl. No. 14/559,605, filed Dec. 3, 2014, Office Action, dated Nov. 9, 2015.
U.S. Appl. No. 14/011,634, filed Aug. 27, 2013, Office Action, dated Oct. 6, 2015.
U.S. Appl. No. 14/011,634, filed Aug. 27, 2013, Final Officce Action, dated May 19, 2016.
U.S. Appl. No. 14/011,669, filed Aug. 27, 2013, Office Action, dated Jun. 2, 2015.
U.S. Appl. No. 14/576,021, filed Dec. 18, 2014, Interview Summary, dated May 13, 2015.
Goodell, "Official Playing Rules and Casebook of the National Football League", dated 2011, http://www.nfl.com/static/content/public/image/rulebook/pdfs/2011_Rule_Book.pdf , in 2 parts.
U.S. Appl. No. 14/559,605, filed Dec. 3, 2014, Notice of Allowance, dated Oct. 5, 2016.
U.S. Appl. No. 14/011,634, filed Aug. 27, 2013, Notice of Allowance, dated Oct. 7, 2016.
U.S. Appl. No. 14/011,669, filed Aug. 27, 2013, Final Office Action, dated Nov. 3, 2016.
Malik, U.S. Appl. No. 14/576,007, filed Dec. 18, 2014, Examiners Answers, dated Dec. 16, 2016.
Dubin, U.S. Appl. No. 14/576,021, filed Dec. 18, 2014, Notice of Allowance, dated May 5, 2017.
Malik, U.S. Appl. No. 14/576,007, filed Dec. 18, 2014, Notice of Allowance, dated May 11, 2018.
Tedeschi, Tracking Major League Baseball, a Perfect Sport for an App, dated Mar. 28, 2012, www.nytimes.com/2012/03/29/technology/personaltech/a-look-at-atbat-scoremobile-gameday-and-draft-kit.html.
Szymanski, "GameCast", dated Aug. 28, 2010, http://aaron-evodesign.blogspot.com/2010/08/gamecast.html
Lindsey, "Best App for Sports News Junkies", dated Aug. 31, 2011, https://www.weird.com/2011/08/reviews_apps/.

* cited by examiner

```
<play playId="856" teamId="1800" possessionTeamId="1800" penalty="false" scoring="false" endQuarter="false" goalToGo="false" time="01:38" timeOfDay="01:59:26" quarter="1" down="2" yardsToGo="10" yardline="GB 33">
  <playDescription>(1:38) 26-D.Harris right end to GB 38 for 5 yards (52-P.Willis, 91-R.McDonald).</playDescription>
</play>
```

GAME EVENT DISPLAY WITH A SCROLLABLE GRAPHICAL GAME PLAY FEED

CROSS-REFERENCE TO RELATED APPLICATIONS; BENEFIT CLAIM

This application claims the benefit of U.S. Provisional Application No. 61/870,182 filed Aug. 26, 2013, the entire contents of which are hereby incorporated by reference for all purposes as if fully set forth herein, under 35 U.S.C. § 119(e).

TECHNICAL FIELD

The present disclosure relates to displaying information about game plays for sporting events in the context of computer display devices. The disclosure relates more specifically to techniques for displaying a scrolling summary of game plays associated with a sporting event in mobile computing devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Certain games, or sporting events, are comprised of plays. A play may be a series of movements by at least one player, frequently in concert with a team of players, to score points, achieve a goal, or advance the position of a team, ball, puck, or other object(s). Examples include plays in the American game of football. Frequently, another player, or team of players, acts in opposition to prevent advancement.

Fans frequently review game plays for the purpose of experiencing the play again, viewing details of the play, or analysis of the play or the game. For example, fans will review one or more plays in which a score was made. Accordingly, plays may be made available to fans to review. One method of presenting reviewable plays is to post links to a handful of key plays on a website. However, merely linking to plays may be overwhelming and difficult for a fan to find a particular play that the fan wants to review. Therefore, there is a need for improved techniques of displaying information about game plays.

SUMMARY OF THE INVENTION

The appended claims may serve as a summary of the invention.

DETAILED DESCRIPTION

Figure 1A:
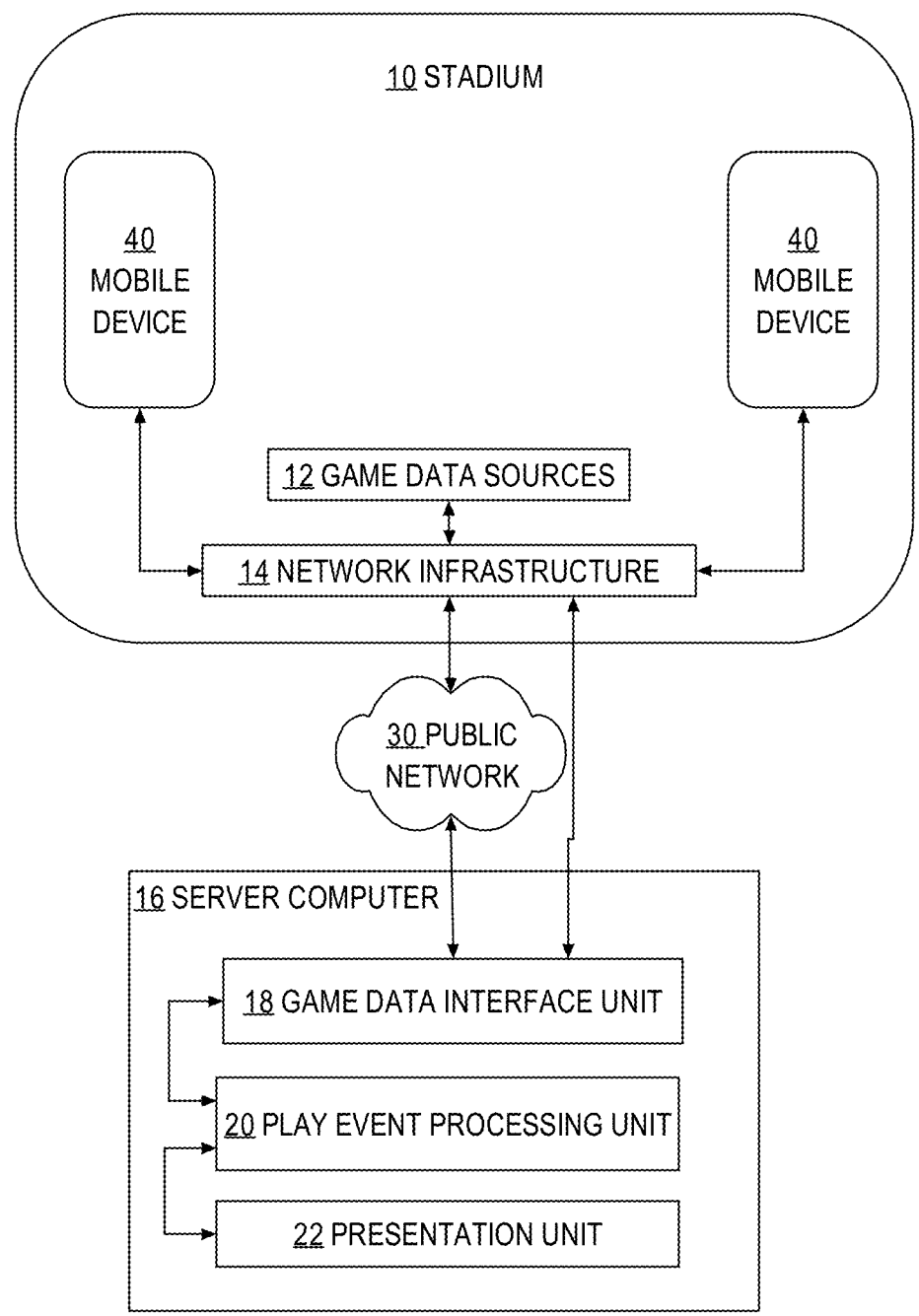
FIG. 1A illustrates an example networked computer system configured to process game play data and provide display data useful in mobile computing devices.

Techniques for displaying a scrollable graphical game play feed associated with a sporting event are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
    1.0 General Overview
    2.0 Structural and Functional Overview
        2.1 Technical Context
        2.2 Play Events
        2.3 Process Overview
        2.4 Updating Play Event Icons and Generating Markers
        2.5 Filtering Graphical Tiles
    3.0 Example Graphical User Interface with Scrollable Graphical Tiles
        3.1 Graphical Tiles
        3.2 Super Graphical Tiles and Nested Graphical Tiles
        3.3 Play Event Icons
        3.4 Markers
        3.5 Fames and Indicators
        3.6 Drive Chart
        3.7 Application 4.0 Implementation Mechanisms—Hardware Overview
5.0 Extensions and Alternatives

---

1.0 General Overview

Displaying a scrollable graphical game play feed associated with a sporting event is described. In an embodiment, a method comprises receiving a plurality of play events associated with a sporting event, wherein each play event of the plurality of play events comprises a game clock time, a description, and identifies a sports team of a plurality of sports teams; for each play event in the plurality of play events: generating a graphical tile that is associated with the play event; configuring an appearance of the graphical tile based, at least in part, on the description and the sports team of the play event; causing to display a graphical tile list in a graphical user interface of a mobile computing device, wherein the graphical tile list includes one or more of the graphical tiles listed in a chronological order based on the game clock time in the play event associated with each graphical tile. In some embodiments, the chronological order is reverse chronological order.

In some embodiments, each play event of the plurality of play events may be associated with an event type; for each play event in the plurality of play events an icon may be determined based, at least in part, on the event type that is associated with the play event, and the icon may be displayed in the graphical tile associated with the play event. Each play event of the plurality of play events may be associated with a media type. For each play event in the plurality of play events associated with at least a particular media type an icon may be determined based, at least in part, on the media type that is associated with the play event. The icon may be displayed in the graphical tile associated with the play event.

In some embodiments, a selection of a particular team may be received; in response to receiving the selection, the plurality of play events may be filtered to include play events of the particular team. At least one graphical tile associated with at least one play event in the plurality of play events that is associated with the particular team may be caused to be displayed. Each graphical tile associated with each play event in the plurality of play events that is not associated with the particular team may be caused to not be displayed. Additionally or alternatively, each play event of the plurality of play events may be associated with an event type, and a selection may be received for a particular event type; in response to receiving the selection, the plurality of play events may be filtered to include only play events of the event type. At least one graphical tile associated with at least one play event in the plurality of play events that is associated with the particular event type may be caused to be displayed. Each graphical tile associated with each play event in the plurality of play events that is not associated with the particular event type may be caused to not be displayed.

In some embodiments, a new play event comprising a new game clock time and identifying a sports team of the plurality of sports teams may be received; a new graphical tile for the new play event may be generated. The new graphical tile may be customized based, at least in part, on the sports team of the new play event. The new graphical tile may be caused to be displayed in the graphical tile list in a position based, at least in part, on the new game clock time.

In some embodiments, the graphical tile list may be a scrollable list of graphical tiles. For each play event in a subset of the plurality of play events, the play event may be associated with a particular icon from among a plurality of different icons based, at least in part, on the sports team of the play event. A scroll bar adjacent to the scrollable list of graphical tiles may be caused to be displayed in the graphical user interface. The scroll bar may represent at least a portion of a time duration of the sporting event. For each play event in the subset of the plurality of play events, the particular icon, at a particular linear position, in the scroll bar may be caused to be display. The particular linear position may be based, at least in part, on the game clock time of the play event.

In some embodiments, each play event of the plurality of play events represents one or more plays in the sporting event and includes a description of the one or more plays. The appearance of a graphical tile may be configured to use the description in the play event associated with the graphical tile.

In some embodiments, a particular graphical tile represents a drive of an American football game comprising a plurality of plays. Upon receiving a selection for the particular graphical tile, a drive chart illustrating the forward progress of each play in the plurality of plays may be caused to be displayed.

In some embodiments, a particular graphical tile that is associated with a particular play event may be caused to be displayed. The particular play event may represent a drive in an American football game, and comprise a set of play events. Each play event in the set of play events may represent a play that is part of the drive. A first selection selecting the particular graphical tile may be received; in response to receiving the first selection, a plurality of graphical tiles may be caused to be displayed, each of which may be associated with a play event in the set of play events. A second selection selecting a certain graphical tile of the plurality of graphical tiles may be received; in response to receiving the second selection, recorded media content contained or referenced in the play event associated with the certain graphical tile may be caused to be displayed.

In some embodiments, a particular graphical tile may be associated with a particular play event that represents a play recorded from a plurality of camera angles. A first selection selecting the particular graphical tile may be received; in response to receiving the first selection, a plurality of graphical tiles may be caused to be displayed. Each of the plurality of graphical tiles may be associated with a single camera angle of the plurality of camera angles of the play. A second selection selecting a certain graphical tile of the plurality of graphical tiles may be received; in response to receiving the second selection, the play recorded from the single camera angle associated with the certain graphical tile may be caused to be displayed.

In other embodiments, the invention encompasses a computer apparatus and a computer-readable medium configured to carry out the foregoing steps.

2.0 Structural and Functional Overview

2.1 Technical Context

FIG. 1A illustrates an example networked computer system configured to process game play data and provide display data useful in mobile computing devices. In an embodiment, a stadium 10 comprises a site at which a sporting event or game is played. Stadium 10 broadly represents any form of arena, field, ground or grounds, park, or other place at which a sporting event may be played or undertaken. Typically stadium 10 comprises a playing field, pitch, track or other game play facility, seating for public attendees, and fixed or mobile facilities for technical personnel who are involved in producing a broadcast, telecast, or other recording of the sporting event. Various embodiments may include stadiums 10 of any size and this disclosure specifically contemplates the use of stadiums with seating for any of a few hundred to in excess of 50,000 attendees or fans.

One or more game data sources 12 are positioned within or near the stadium and are configured to obtain or record data about game play. Examples of game data sources include television or video cameras, sound recording equipment, computers associated with statisticians or game coverage personnel, and support infrastructure for any of the foregoing. Output of game data sources 12 may include digital or analog audiovisual feeds representing television or video of the game, pure digital data or structured data comprising metadata for the game or play events, transcripts, commentary, and other data representing the game or play events.

Game data sources 12 are communicatively coupled to network infrastructure 14 in stadium 10. Network infrastructure 14 may comprise wired network interfaces, wireless access points, routers, switches, access servers, authentication servers, cabling, and related networking or internetworking equipment or gear.

In an embodiment, network infrastructure is coupled to one or more public networks 30 which may comprise any of a LAN, WAN, internetworks, or internets. In an embodiment, a server computer 16 is coupled to the network 30; additionally or alternatively, the server computer may have a direct connection to the network infrastructure, for example, when the server computer is co-located with the stadium 10 or located nearby.

A plurality of mobile devices 40 are coupled to network infrastructure 14 and are located within stadium 10. In various embodiments, mobile devices 40 may comprise any of smartphones, tablet computers, personal digital assistants, netbook computers, ultrabook computers, laptop computers or other mobile devices. In one embodiment, the mobile devices 40 are associated with attendees of stadium 10 and there may be thousands of mobile devices having concurrently active connections to the network infrastructure 14. Connections may be wired, or may be wireless via wireless access points that are located throughout stadium 10 in positions adjacent to seats in the stadium or in other locations capable of establishing and maintaining multiple concurrent connections to the mobile devices 40.

Server computer 16 in FIG. 1A broadly represents one or more physical computers, clusters, or processors in cloud service providers or data centers. In various embodiments, any number of such computers may be used. In one embodiment, server computer 16 comprises a game data interface unit 18, a play event processing unit 20, and a presentation unit 22. In an embodiment, game data interface unit 18 is configured to request and/or receive game play data from game data sources 12 and to format, transform, or otherwise process the game play data for use in other functional units. For example, game data interface unit can perform buffering, classification and categorization functions.

In an embodiment, the play event processing unit 20 is configured to perform filtering, selection, association and other functions in the manner described further herein in connection with the process diagrams.

In an embodiment, the presentation unit 22 is configured to generate data that can drive displays of external computing devices such as smartphones, tablet computers, other mobile devices, personal computers, web browsers, and other systems. For example, in one embodiment the presentation unit may implement an HTTP server and/or one or more mobile device server-side applications that can interoperate with compatible client-side applications or "apps" on the mobile computing devices 40 to provide data that the apps are capable of rendering in a graphical user interface on the mobile computing devices. Specific example embodiments of screen displays for a mobile computing device user interface are described further herein.

2.2 Play Events

In an embodiment, a play event may include a description of one or more plays. Additionally or alternatively, a play event may include, or reference, a recorded segment of a game. For example, a play event may include a play in a sporting event recorded by one or more devices and stored on one or more non-transitory storage media. "Recorded," in this sense, includes obtaining pictures, sound, or data, or a combination, relating to a segment of a game as the game is played, and also includes replaying previously recorded pictures, sound and/or data for a segment of a game that was played in the past. Thus, a segment of a game may be transiently recorded as it occurs, or replayed from stored audiovisual data. Additionally or alternatively, a play event may include, or reference, a series of plays in a sporting event. A series of plays may include a set of field movements or drives. The series of plays may be continuous and linear in time. Additionally or alternatively, a drive may begin when a team first gains possession of the ball, and may conclude when one or more conditions are satisfied: the possessing team scores a goal, the possessing team loses possession of the ball, and/or a particular time period ends. Additionally or alternatively, a drive may be determined by analyzing text, such as the description, in one or more play events. For example, if a play event description indicates a team receives possession of the ball, the play event may indicate the beginning of a drive. Similarly, if a play event description indicates the team scores, the play event may indicate the end of a drive. A drive may correspond to a play event, which comprises a set of play events. Additionally or alternatively, a drive may correspond to a different data structure that includes or references the set of play events. Additionally or alternatively, the series of plays may be recorded segments of a game stitched together from disjoint time periods, from various points of view, and/or highlighting one or more players or teams. For example, a play event may include, or reference, a series of video clips stitched together of a team receiving a ball, proceeding to the other end of the playing field, and scoring one or more points. Additionally or alternatively, a play event may include, or reference, a plurality of play events. Typically, mobile device 40 receives play events in real time within milliseconds or seconds after the description is generated and/or media included or referenced in the play event is recorded.

A play event may be associated with one or more event types. For example, in American football, a play event may be associated with "interceptions", "punts", "drives", "scoring plays", "touchdowns", "field goals", "penalties," "personal fouls", "special teams plays," "big offensive plays", and/or "big defensive plays".

A play event may be associated with a particular team. For example, a play event may be associated with a team that has possession of the ball at the beginning and/or end of a particular play. Additionally or alternatively, a play event may be associated with one or more teams to indicate that the one or more teams are highlighted in the play event. Additionally or alternatively, a play event may be associated with a team by an operator. Additionally or alternatively, a play event may be associated with a team automatically.

A play event may be associated with one or more players. For example, one or more players may be highlighted in a play event. Accordingly, the play event may be associated with each of the highlighted players.

A play event may include, or reference, one or more statistics or game states. For example, a play event may include the yards gained during the game play, the distance left to achieve a milestone (e.g., a first down in an American football game), the number of plays that have been played since the most recent milestone, the period or quarter number, the points scored or goals achieved if any, the type of score or goal if any, an indicator as to whether a team has an additional opportunity to score points or achieve a goal, a unique play identifier, one or more penalties issued during the play if any, the score, the position of a ball, advancement of a team, the number of points one or more players have scored, the time of day at the beginning and/or end of the play event, the state of the game play clock at the beginning and/or end of the play event, the number of plays contained in the play event, the length of the play event, the game-clock time or actual time each play event covers, and a time in one or more time zones.

Figure 6:
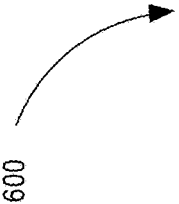
FIG. 6 presents a real time play event for a recent play during a live sporting event, in an example embodiment.

FIG. 6 presents a real time play event for a professional American football play that may be received by mobile device 40, in an example embodiment. In this example, play event 600 is in eXtensible Markup Language ("XML") format. However, other data interchange formats can be used as well. Play event 600 indicates that a play occurred, provides an identifier for the play, specifies the team to which the play pertains, specifies the team in possession of the ball when the play commenced, indicates that no penalty occurred on the play, specifies that the play did not result in a score, indicates that the play was not the last play of a quarter, specifies that the play did not commence when the team in possession was goal to go with respect to the non-possessing team's end zone, indicates the time left in the current quarter when the play completed, indicates the time of day when the play completed, specifies the current quarter, specifies the current down when the play commenced, indicates the number of yards to go for a first down when the play commenced, and specifies the yard line the play started on. Play event 600 also includes a textual play description. Some or all of this information may be used by a graphical game play feed application to render or display graphical tiles, play event icons, and/or recent play indicators on a display of mobile device 40.

Figure 7:
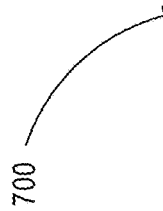
FIG. 7 presents a real time play event for a recent play during a live sporting event, in an example embodiment.

FIG. 7 presents a real time play event for a professional American football play that may be received by mobile device 40, in an example embodiment. In this example, play event 700 is in XML format. However, other data interchange formats can be used as well. Play event 700, among other things, indicates that a play occurred and that the play was a "big" or important play, provides an identifier for the game, provides an identifier for the play, indicates that the play ended in a score, specifies the active team or the team that scored, specifies the home team by an identifier and abbreviation, specifies the visiting team by an identifier and abbreviation, specifies the quarter the play took place in, and specifies the game clock at the beginning of the play. Play event 700 includes a textual play description. Play event 700 also includes a reference to a recorded video of the play described in the description with an address to retrieve the video stored as a uniform resource location ("URL"). The media reference includes a video identifier as well as several textual descriptions related to a referenced video: a headline, a caption for the referenced video, and a descriptive URL. Some or all of this information may be used by a graphical game play feed application to render or display graphical tiles, play event icons, and/or recent play indicators on a display of mobile device 40.

2.3 Process Overview

Figure 1B:
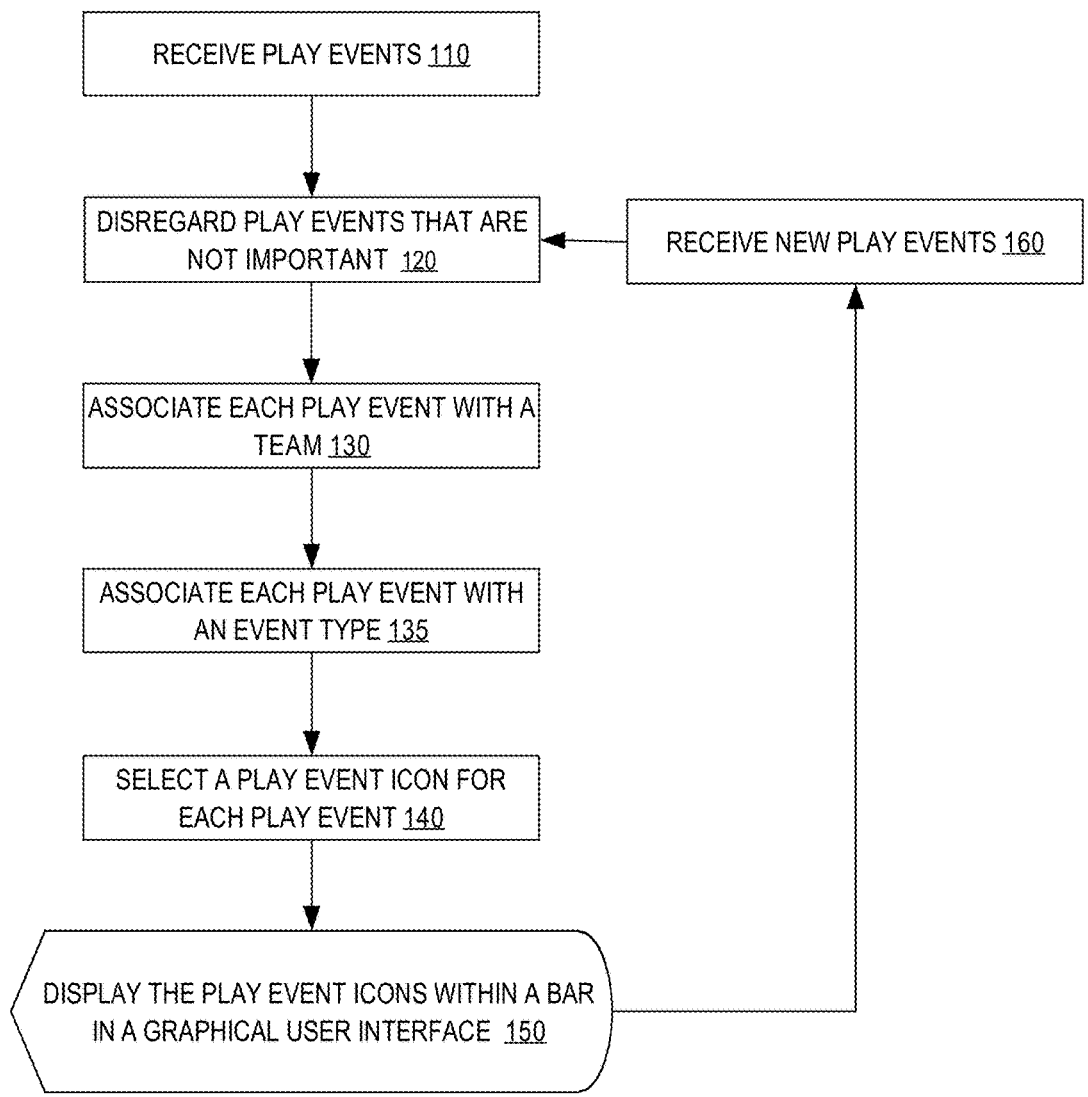
FIG. 1B illustrates a process for receiving play events, and displaying play event icons corresponding to the received play events in a bar within a graphical user interface, according to an embodiment.

FIG. 1B illustrates a process for receiving play events, and displaying graphical tiles corresponding to the received play events in a graphical tile list within a graphical user interface, according to an embodiment. While FIG. 1B illustrates example steps according to an embodiment, other embodiments may omit, add to, reorder, and/or modify any of the steps shown. Referring now to FIG. 1B, in step 110, an application receives play events. For example, the application receives a plurality of play events from a server or a server application.

Additionally, the application may disregard play events that are not important. Each play event may include a field, which when selected or set to a particular value designates that the play event is important. Additionally or alternatively, one or more play events may be nested in a data structure designating that the play event is important. Additionally or alternatively, the application may determine a play event is important based, at least in part, on the play event's description. For example, the application may determine that a play event is important if the description includes particular words, such as "goal." Accordingly, if the application determines that a play event is important then the application may continue to process the play event, otherwise the application may discard or ignore the play event, at least with respect to generating graphical tiles.

In step 130, the application associates each play event with a team. For example, the application may determine which team a play event should be associated with based, at least in part, on the play event description and/or other data included in the play event. Additionally or alternatively, a play event may include a field that designates an associated team.

In step 135, the application associates each play event with an event type. For example, the application may determine which event types a play event should be associated with based, at least in part, on the play event description and/or other data included in the play event. Additionally or alternatively, a play event may include a field that designates one or more event types. For example, a play event may include a field that designates that the play event describes an "interception" and "scoring" play, each of which may be an event type.

In step 140, the application generates a graphical tile for each play event. For example, for each play event the application may generate a graphical tile based, at least in part, on the team associated with the play event (determined in step 130) and/or the event type(s) associated with the play event (determined in step 135). Additionally, the application may select a play event icon for one or more of the play events. For example, if a play event is determined to be important, then the application may select a play event icon based, at least in part, on the team associated with the play event and/or the event type(s) associated with the play event.

In step 150, the application displays one or more graphical tiles within a graphical tile list in a graphical user interface. For example, the application may include each of the generated graphical tiles in the graphical list. The application may cause to display all of the generated graphical tiles or a subset of the generated graphical tiles in the graphical tile list based, at least in part, on the display area of the device the application is running on and/or the portion or the display area allocated to display the graphical tiles or graphical tile list. As seen in an embodiment illustrated in FIG. 4A, discussed in detail below, four graphical tiles may not be completely displayed simultaneously. The position of each graphical tile in the graphical tile list may be based, at least in part, on the data, such as the game play clock, in each corresponding play event.

Additionally, the application may display the play event icons within a bar in the graphical user interface. For example, for each play event that a play event icon was selected for, the application may display the selected play event icon in a scroll bar. The position of each play event icon in the scroll bar may be based, at least in part, on the data in each corresponding play event.

In step 160, the application receives new play events. For example, the application may receive one or more new play events. Accordingly, the application may repeat steps 130 through 150 for the newly received play events.

2.4 Updating Play Event Icons and Generating Markers

Figure 2:
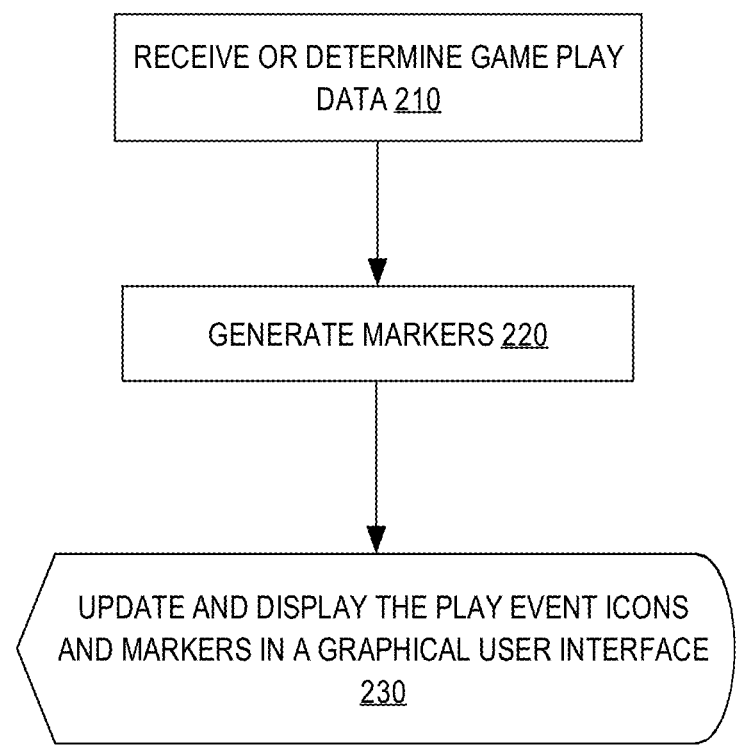
FIG. 2 illustrates a process for receiving and/or determining game play data, generating markers, updating existing play event icons and markers, and displaying the updated play event icons and markers, in an example embodiment.

The appearances of play event icons, markers, or any other visual elements (discussed in herein), are driven from game play data and may occur automatically in response to parsing the game play data. FIG. 2 illustrates a process for receiving and/or determining game play data, generating markers, updating existing play event icons and markers, and displaying the updated play event icons and markers, in an example embodiment. While FIG. 2 illustrates example steps according to an embodiment, other embodiments may omit, add to, reorder, and/or modify any of the steps shown. Referring now to FIG. 2, in step 210, an application receives and/or determines game play data. For example, an application may receive game play data from a server or a server application. The game play data may be in formatted XML and/or any other proprietary or conventional data interchange formats readable by the application. The game play data may include play events or other data related to the game, such as the current game clock time, the current score, or the current position of a team or ball.

In step 220, the application generates markers. For example, in response to receiving game play data that the game clock has been reset for a new quarter, the application may generate a marker, which indicates the beginning of the new quarter.

In step 230, the application updates and displays the play event icons and markers in a graphical user interface. For example, in response to generating one or more markers in step 220, the application may display the one or more markers. The marker(s) displayed may be in a scroll bar and/or inserted into a graphical tile list to visually demarcate play event icons and/or graphical tiles corresponding to play events with game clock times in a particular quarter or period. Furthermore, in response to receiving the game play data in step 220, the application may update the position of the play event icons, graphical tiles, and/or previously displayed markers.

2.5 Filtering Graphical Tiles

Figure 3:
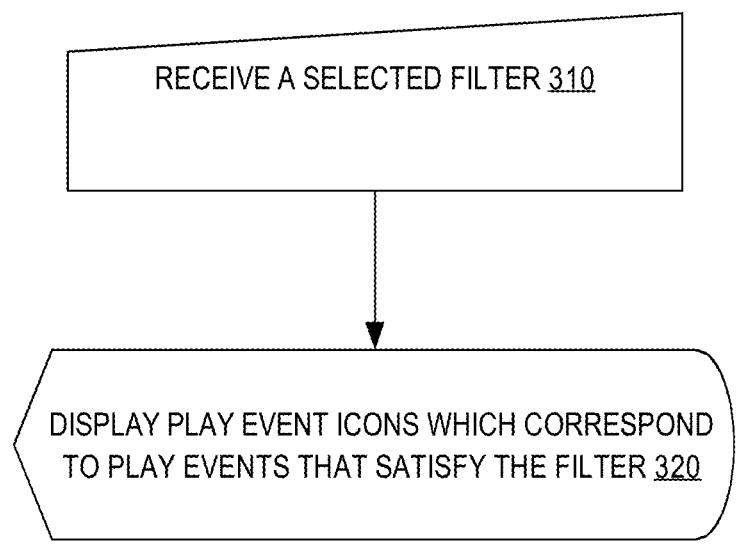
FIG. 3 illustrates a process for receiving and applying a filter to the received play events, and displaying the graphical tiles and/or the play event icons that correspond to the play events that satisfy the filter, in an example embodiment.

Graphical tiles may be filtered based, at least in part, by event type, team, player, game clock time, media included or referenced, and/or any other data or attribute included, referenced, or associated with a play event. FIG. 3 illustrates a process for receiving and applying a filter to the received play events, and displaying the graphical tiles and/or the play event icons that correspond to the play events that satisfy the filter, in an example embodiment. While FIG. 3 illustrates example steps according to an embodiment, other embodiments may omit, add to, reorder, and/or modify any of the steps shown. Referring now to FIG. 3, in step 310, an application receives a selected filter. For example, an application may receive user input selecting all play events that include or reference a type of content (e.g., video), are associated with a particular team, and/or are associated with one or more event types (e.g., scoring plays).

In step 320, the application displays one or more graphical tiles and corresponding play event icons which correspond to play events that satisfy the filter. For example, in response to receiving the filter in the previous example, the application may remove from the graphical list any graphical tile that does not correspond to a play event that is not associated with the particular team, is not scoring play, or does not include or reference a video replay. The application may also remove from display any play event icon that does not correspond to a play event that is not associated with the particular team, is not scoring play, or does not include or reference a video replay. Furthermore, the application may cause to display any graphical tile in the graphical tile list that corresponds to a play event that is associated with the particular team, is a scoring play, and includes or references a video. The application may also cause to display any play event icons that corresponds to a play event that is associated with the particular team, is a scoring play, and includes or references a video.

3.0 Example Graphical User Interface with Scrollable Graphical Tiles

Play events may be displayed in an application executed on a mobile device 40 for users to scroll through and view. FIG. 4A, FIG. 4B, FIG. 4C, FIG. 4D, FIG. 4E, and FIG. 4F illustrate a graphical tile list that includes a plurality of graphical tiles in various example embodiments. FIG. 4A, FIG. 4B, FIG. 4C, and FIG. 4D also illustrate a graphical tile list that includes an annotated scroll bar and game-state markers, in various example embodiments. FIG. 4A, FIG. 4B, FIG. 4C, FIG. 4D, FIG. 4E, and FIG. 4F illustrate various example embodiments for purposes of illustrating clear examples, other embodiments may omit add to, reorder, and/or modify any of the elements shown. In the embodiments illustrated in FIG. 4A, FIG. 4B, FIG. 4C, FIG. 4D, FIG. 4E, and FIG. 4F, application 400 includes graphical tile list 405. Additionally, in the embodiments illustrated in FIG. 4A, FIG. 4B, FIG. 4C, and FIG. 4D, application 400 includes bar 450. Bar 450 includes play event icons 460, 462, 464, 466, and 468, and markers 471, 472, and 473.

3.1 Graphical Tiles

Figure 4A:
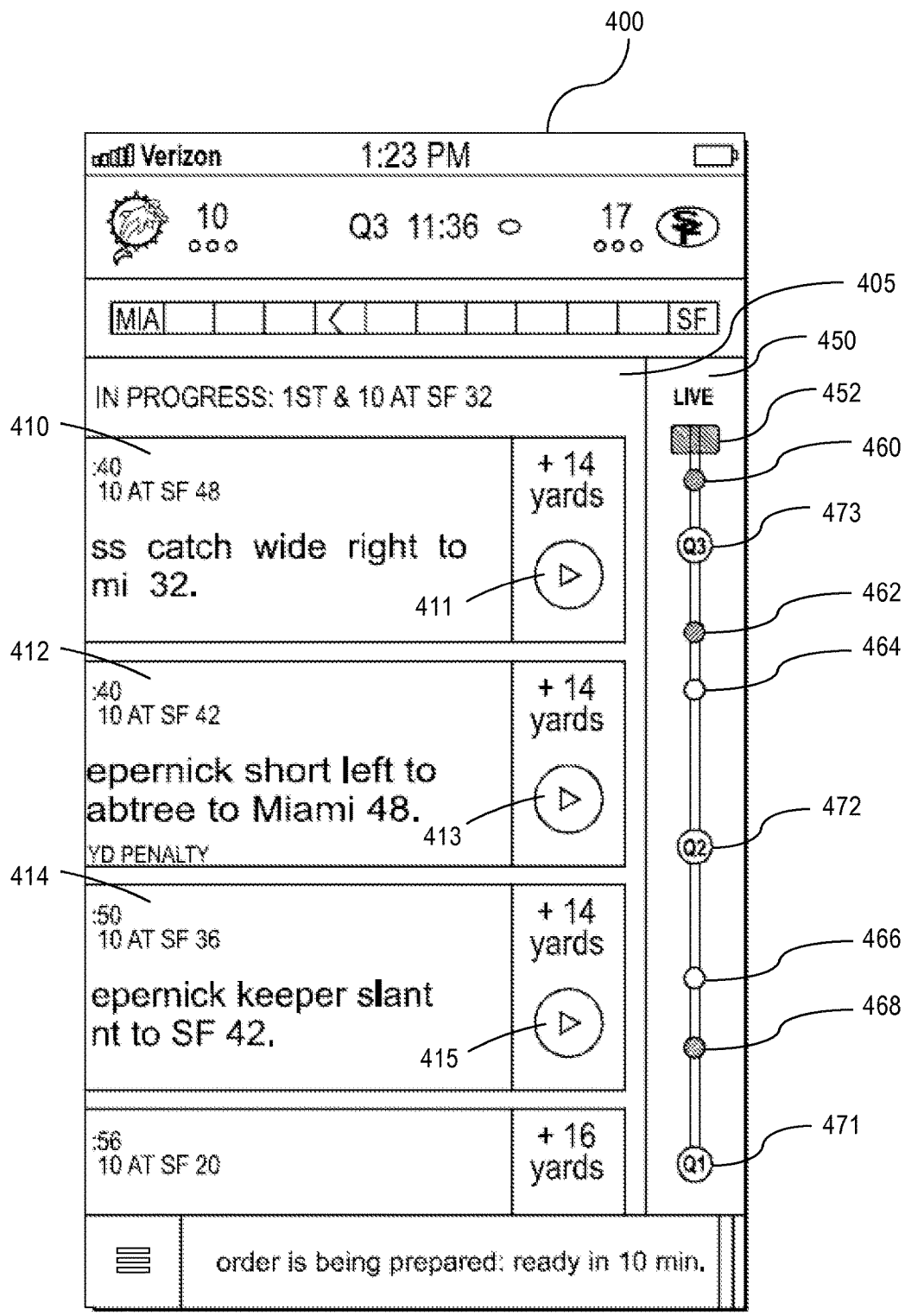
FIG. 4A illustrates a graphical tile list that includes a plurality of graphical tiles and an annotated scroll bar with a compressed frame and game-state markers, in an example embodiment.
Figure 4B:
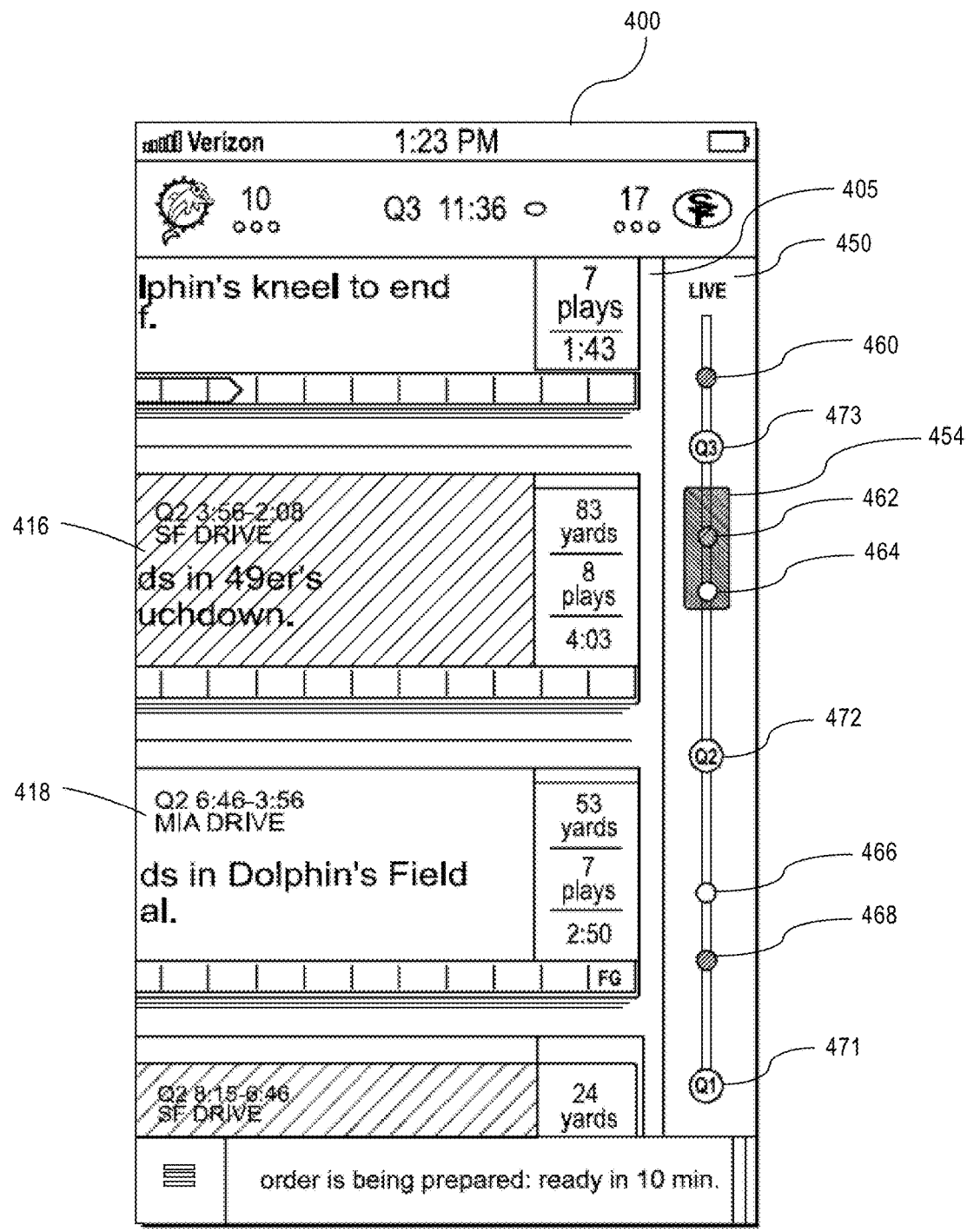
FIG. 4B illustrates a graphical tile list that includes a plurality of graphical tiles and an annotated scroll bar with an expanded frame and game-state markers, in an example embodiment.
Figure 4C:
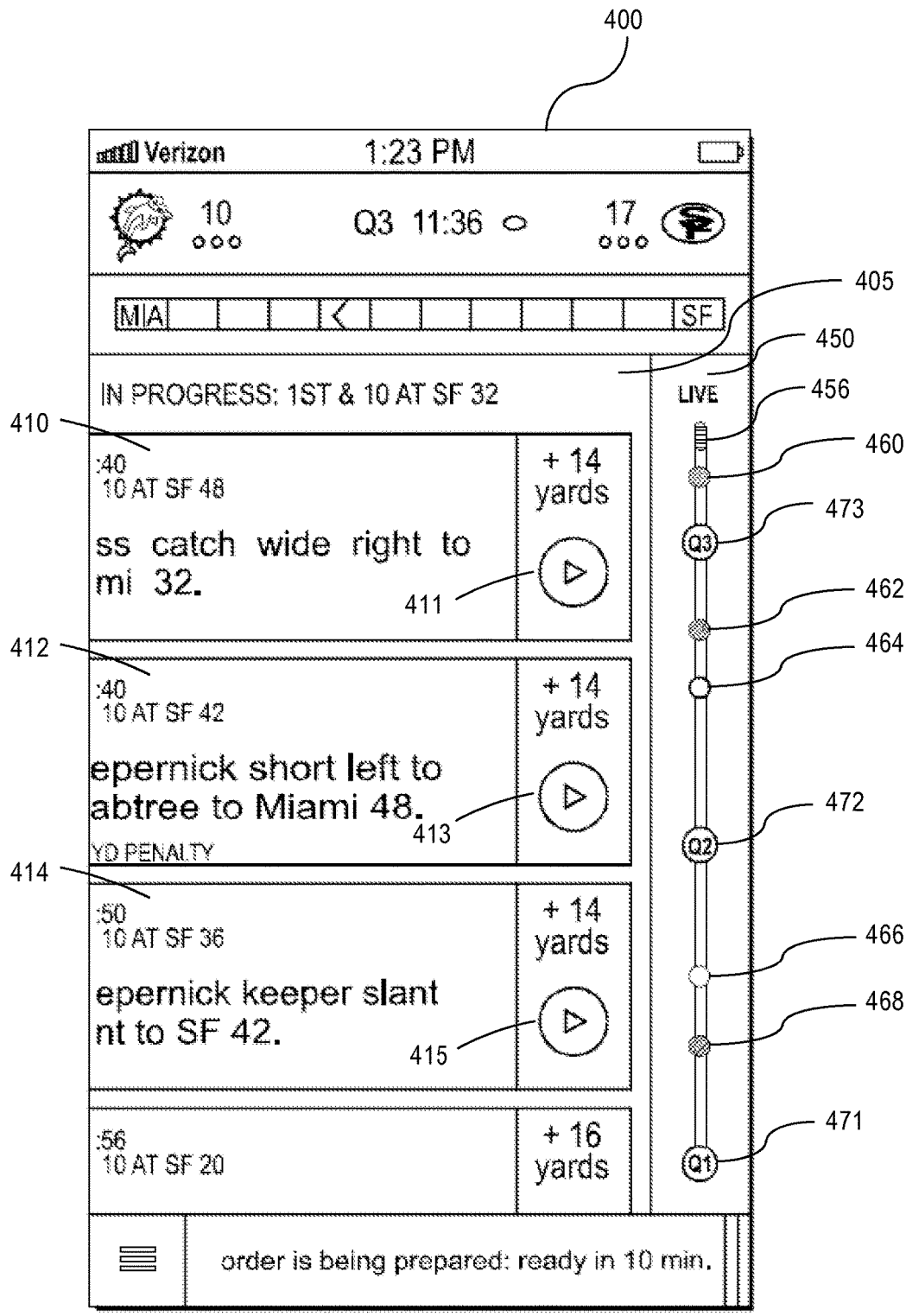
FIG. 4C illustrates a graphical tile list that includes a plurality of graphical tiles and an annotated scroll bar with a compressed indicator and game-state markers, in an example embodiment.
Figure 4D:
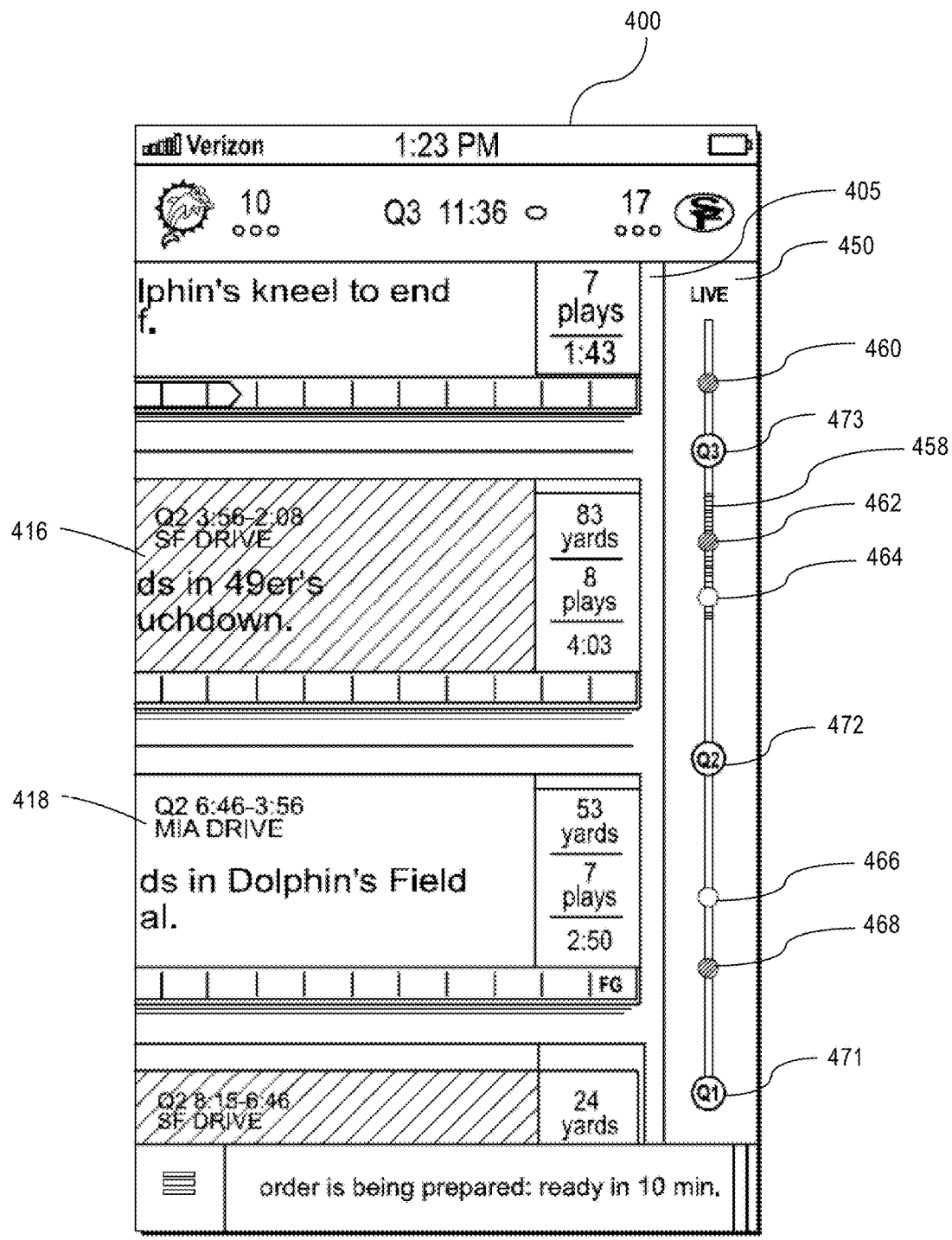
FIG. 4D illustrates a graphical tile list that includes a plurality of graphical tiles and an annotated scroll bar with an expanded indicator and game-state markers, in an example embodiment.

In FIGS. 4A and 4C, graphical tile list 405 includes graphical tile 410, graphical tile 412, and graphical tile 414. In FIG. 4B and FIG. 4D, graphical tile list 405 includes graphical tile 416 and graphical tile 418. Graphical tiles 410, 412, 414, 416, and 418 may each be associated with, and/or correspond to, a play event, and may include or reference the data included or referenced in the play event. For example, graphical tiles 410, 412, 414, 416, and 418 each include a description from the corresponding play event, which refers to one or more plays during a game. The appearance of graphical tiles or any other visual elements, such as a description in a graphical tile, or presence or absence of an icon (discussed in detail herein), is driven from game play data and may occur automatically in response to parsing the game play data.

Graphical tiles 410, 412, 414, 416, and 418 may each include other information determined by application 400 or included in the corresponding play event. For example, a graphical tile may include the corresponding play event statistics, such as the state of the game play clock, the position of the ball, and/or the score at the end of the play event. As illustrated in FIG. 4B and FIG. 4D, graphical tile 416 displays data included in a play event that includes or references media that spans from 3:56 in the second quarter to 2:08 in the second quarter. Also as illustrated in FIG. 4B and FIG. 4D, graphical tile 418 displays data included in a play event that includes or references media that spans from 6:42 in the second quarter to 3:56 in the second quarter.

Graphical tiles may be color coded based, at least in part, on the corresponding play event. For example, graphical tile 416 is shaded differently than graphical tile 418. Also, for the purpose of illustrating a clear example, assume that the play event corresponding with graphical tile 416 is associated with the first team. Accordingly, the application 400 may display graphical tile 416 with a first color. Further assume that the play event corresponding with graphical tile 418 is associated with a second team. Accordingly, the application 400 may display graphical tile 418 with a second, different color. The color(s) of a graphical tile may be determined based, at least in part, on the graphical tile's corresponding play event, the team color(s) of the team associated with the corresponding play event, and/or some other internal or external mapping.

Graphical tiles may be visually different based, at least in part, on the event types associated with the corresponding play event. For example, a graphical tile may include one or more icons, such as an icon with an upright stand to indicate that the corresponding play event is associated with a field goal or extra point. A graphical tile may include an icon with arms extended upright to indicate that the corresponding play event is associated with a score, such as a touchdown. A graphical tile may include an icon with arms crossed to indicate that the corresponding play event is associated with a personal foul. Additionally or alternatively, a graphical tile may include an icon, such as a logo, for the team associated with the corresponding play event. Graphical tiles may include a plurality of icons and/or colors. Additionally or alternatively, a graphical tile may include an icon, such as icon 924, which indicates that one or more players were injured during the portion of the game associated with the play event. Additionally or alternatively, a graphical tile may include an icon, such as icon 944, which indicates that a game rule was violated, or at least a violation or penalty was called by a referee, during the portion of the game associated with the play event.

Graphical tiles may be visually different based, at least in part, on one or more indicators included in a graphical tile. An indicator may indicate statistics or attributes of a portion of the game associated with a play event. For example, graphical tiles 920, 930, and 950 include indicators 922, 932, and 952, respectively, which show the yardage gained or lost during the portion of the game corresponding to each play event. Graphical tile 940 includes indicator 942, which indicates that a play ended in an incomplete pass. Other indicators may describe other features of a drive or play, such as the total distance of the drive, duration of a play, number of new plays (for example, indicator 1042), or number of plays that are "big" plays (for example, indicator 1052).

Graphical tiles may be visually different based, at least in part, on the type of recorded media referenced or included in the corresponding play event. For example, a graphical tile may include an icon of a film strip to indicate that the corresponding play event references or includes a recorded video segment. A graphical tile may include an icon of a picture to indicate that the corresponding play event references or includes one or more still frame pictures. A graphical tile may include an icon of a speaker to indicate that the corresponding play event references or includes a recorded audio segment. Additionally or alternatively, a graphical tile may include an icon, such as a logo, for the team associated with the corresponding play event. Graphical tiles may include a plurality of icons and/or colors.

Graphical tiles may be visually different based on user preference. For example, graphical tiles 410, 412, and 414 are visually different than graphical tiles 416 and 418. Graphical tiles 410, 412, and 414 include links 411, 413, and 415, respectively, which may link to a video and/or audio recording of one or more plays. Accordingly, when any of links 411, 413, or 415 are selected by a user, application 400 may present the linked media to the user. In contrast, the entire graphical tile of graphical tiles 416 and 418 may be a link to the media referenced in the corresponding play event. Accordingly, when either of graphical tiles 416 or 418 is selected by a user, application 400 may present the linked media to the user. For example, if a user selects graphical tile 418, application 400 may adjust the size of graphical tile 418 and display the linked media, and/or the controls to the linked media, inside graphical tile 418.

A graphical tile may correspond to a play event that comprises a set of play events. For example, in response to a user selecting either graphical tiles 416 or 418, each of which may correspond to a play event that comprises a set of play events, application 400 may display new graphical tiles to the user. Each of the new graphical tiles may correspond to a play event in the set of play events. Each of the play events in the set of play events may correspond to a play in a drive. In response to a user selecting one of the new graphical tiles, application 400 may present the user with the media included or referenced in the corresponding play event. Additionally or alternatively, in response to a user selecting either graphical tile 416 or 418, application 400 may display a drive chart. A drive chart, described in detail below, illustrates the forward progress of each play in a set of plays.

Additionally or alternatively, in response to a user selecting either graphical tiles 416 or 418, each of which may correspond to a play event that comprises a set of play events, new graphical tiles may be displayed to the user. Each of the new graphical tiles may correspond to a play event in the set of play events. Each of the play events in the set of play events may correspond to the same play or segment of the game, but from a different perspective, such as different camera angle and/or commentator. In response to a user selecting one of the new graphical tiles, application 400 may present to the user the media included or referenced in the corresponding play event.

Graphical tiles 410, 412, 414, 416, and 418 may be ordered within graphical tile list 405 in a chronological order. For example in FIG. 4B and FIG. 4D, graphical tile 416 corresponds with a play event that is more recent than graphical tile 418. In the embodiment illustrated in FIG. 4B and FIG. 4D, graphical tile list 405 lists graphical tiles in reverse chronological order. Accordingly, graphical tile 416 is listed before graphical tile 418 in graphical tile list 405.

3.2 Super Graphical Tiles and Nested Graphical Tiles

Figure 4E:
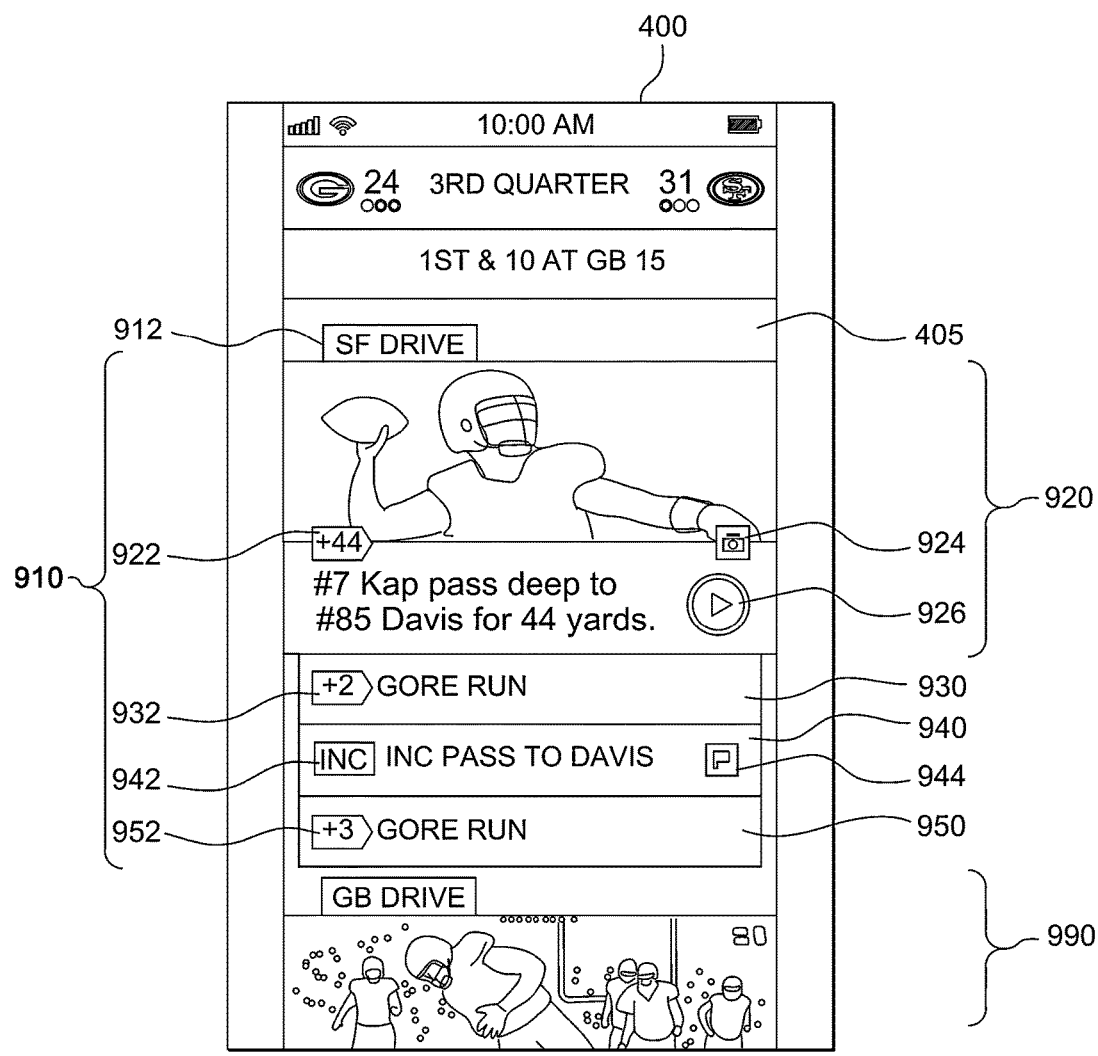
FIG. 4E illustrates a graphical tile list that includes a plurality of graphical tiles, including super graphical tiles and nested graphical tiles, in an example embodiments.

In an embodiment, a super graphical tile may be a graphical tile that may reference or include one or more other graphical tiles. A super graphical tile may comprise any of the features discussed herein regarding graphical tiles and therefore, for brevity, a super graphical tile may be referred to as a graphical tile. For example, a super graphical tile may correspond to a drive that comprises a set of plays. Each play in the set of plays may correspond to a play event in a set of play events. And, each play event may be graphically illustrated as a graphical tile, or nested graphical tile. A nested graphical tile may be a graphical tile that is illustrated as part of, or included in, another graphical tile, or super graphical tile. A nested graphical tile may comprise any of the features discussed herein regarding graphical tiles and therefore, for brevity, a nested graphical tile may be referred to as a graphical tile. For example, FIG. 4E illustrates graphical tile list 405, which includes super graphical tile 910 and super graphical tile 990, each of which represent a drive, in an example embodiment. Super graphical tile 910 corresponds to a drive that comprises four plays. Each play, of the four plays in the drive, corresponds to a play event that is represented by a nested graphical tile: graphical tile 920, graphical tile 930, graphical tile 940, and graphical tile 950.

Figure 4F:
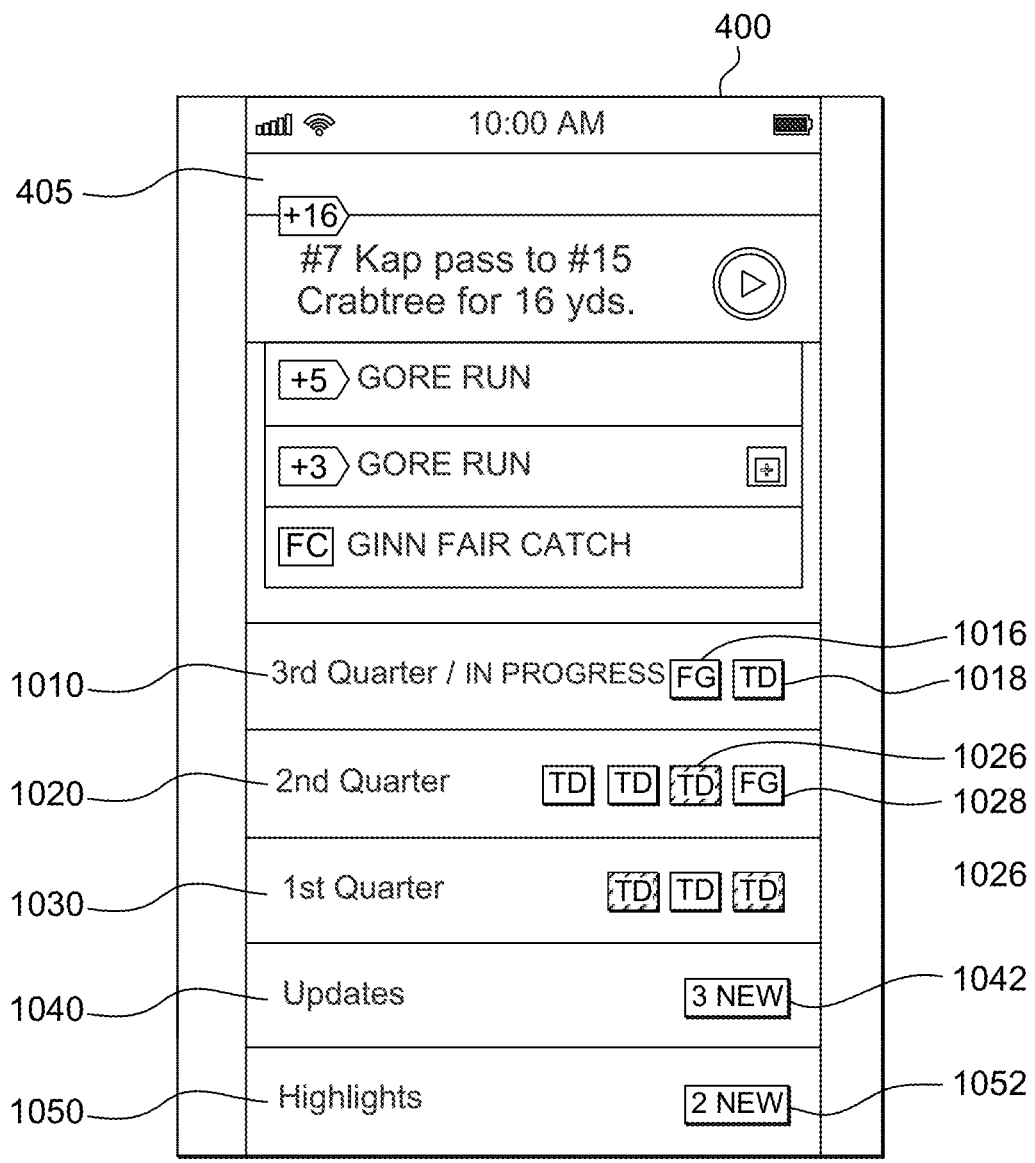
FIG. 4F illustrates a graphical tile list that includes a plurality of graphical tiles, including super graphical tiles and nested graphical tiles, in an example embodiments.

A super graphical tile may reference or include one or more other super graphical tiles. For example, FIG. 4F illustrates graphical tile list 405, which includes super graphical tile 1010, super graphical tile 1020, and super graphical tile 1030. Each super graphical tile of super graphical tiles 1010, 1020, and 1030, represent time periods within a game and include links to graphical tiles, or super graphical tiles, that correspond with drives or plays in a game. As a specific example, super graphical tile 1010 includes link 1016, which may be a link to a super graphical tile that corresponds to a drive in the third quarter that ends in a field goal. As another specific example, super graphical tile 1010 includes link 1018, which may be a link to a super graphical tile that corresponds to a drive in the third quarter that ends in a touchdown. Alternatively, link 1018 may be a link to a graphical tile that corresponds to a play that ends in a touchdown.

A super graphical tile may be selected to reveal additional graphical tiles in graphical tile list 405. For example, super graphical tile 1040 may be a link to one or more graphical tiles (including super graphical tiles or nested graphical tiles) that correspond to play events that were recently generated or received. In response to receiving input that a user selected super graphical tile 1040, the linked graphical tiles may be displayed in graphical tile list 405. Also for example, super graphical tile 1050 may be a link to one or more graphical tiles (including super graphical tiles or nested graphical tiles) that correspond to play events that are deemed to be highlights, or "big" plays or drives. In response to receiving input that a user selected super graphical tile 1050, the linked graphical tiles may be displayed in graphical tile list 405.

Graphical tiles may be displayed in different visual formats and with different data. For example, graphical tiles 910, 920, 930, 940, 950, 1010, 1020, 1030, 1040, and 1050 each include different data in various visual formats. Graphical tile 910 includes indicator 912, which describes which team possesses the ball during the corresponding drive. Also for example, graphical tile 920 includes an image from, and a link (link 926) to, a video clip, referenced by the play event that corresponds to graphical tile 920. In contrast, graphical tiles 930, 940, 950, 1010, 1020, 1030, 1040, and 1050 do not include an image or a link to play a video. In another example, graphical tile 920 includes a longer description than graphical tiles 930, 940, or 950.

Links may be visually different based on the team associated with the play event corresponding to the linked graphical tile. For example, link 1026 may be a different color than link 1028. Accordingly, link 1026 may link to a graphical tile that is associated with a first team, and link 1028 may link to a graphical tile that is associated with a second team.

In FIG. 4E and FIG. 4F, the two most recent drives are illustrated in super tile 910 and super tile 990, and previous drives are grouped into other super tiles which summarize one or more portions of the game: super graphical tile 1010, super graphical tile 1020, super graphical tile 1030, super graphical tile 1040, and super graphical tile 1050. Some super graphical tiles, which summarize one or more portions or plays of the game, may group together graphical tiles representing plays or drives based on game clock time. For example, super graphical tile 1010, which corresponds to the third quarter of a game, includes links (link 1016 and link 1018) to two super graphical tiles representing two drives that took place during the third quarter. Some super graphical tiles, which summarize one or portions of the game, may group together graphical tiles representing plays or drives based on the type of play. For example, super graphical tile 1050 includes a link to at least two graphical tiles representing plays or drives which are designated as "highlights" of the game. A super graphical tile that summarizes one or more portions or plays of a game may include and/or link to graphical tiles already listed in graphical tile list 405.

Graphical tiles may be included in graphical tile list before or after super graphical tiles that summarize one or portions of the game. For example, the most recent graphical tiles may be included first in graphical tile list 405, followed by one or more super graphical tiles that summarize one or portions of the game. Additional graphical tiles may be included in graphical tile list 405 below super graphical tile 1050, which summarizes one or more portions of the game. The most recent graphical tiles may be a particular number of the most recently generated graphical tiles (for example, the last two generated graphical tiles). Additionally or alternatively, the most recent graphical tiles may be the graphical tiles that represent plays or drives that took place in the game within a particular amount of time (for example, the current quarter or the last ten minutes).

3.3 Play Event Icons

In FIG. 4A, FIG. 4B, FIG. 4C, and FIG. 4D, bar 450 includes play event icons 460, 462, 464, 466, and 468. Each of play event icons 460, 462, 464, 466, and 468 may be associated with, or may correspond to, a play event. Furthermore, each of play event icons 460, 462, 464, 466, and 468 may be associated with, or may correspond to, a graphical tile in graphical tile list 405. For the purpose of illustrating a clear example, assume play event icon 462 corresponds to the same play event as graphical tile 416. Accordingly, play event icon 462 may be associated with graphical tile 416. Similarly, play event icon 464 may correspond to the same play event as graphical tile 418. Accordingly, play event icon 464 with graphical tile 418.

Play event icons may be color coded based, at least in part, on the corresponding play event. For example, play event icon 462 may be shaded differently than play event icon 464. Furthermore, for the purpose of illustrating a clear example, assume that the play event that corresponds to play event icon 462 is associated with a first team. Accordingly, play event icon 462 may be displayed with a first color. Further assume that the play event that corresponds to play event icon 464 is associated with a second team. Accordingly, play event icon 464 may be displayed with a second, different color. The color(s) assigned to a play event icon may be designated in the play event icon's corresponding play event, or the team color(s) of the team associated with the corresponding play event.

Additionally or alternatively, a play event icon may visually correspond with the corresponding graphical tile. For example, play event icon 462 has cross-hatching similar to graphical tile 416. Likewise, play event icon 464 does not have cross-hatching since graphical tile 418 also does not have cross-hatching.

Play event icons may be visually different based, at least in part, on the types of plays the corresponding play event is associated with. For example, a play event icon may include an icon with an upright stand to indicate that the corresponding play event is associated with a field goal or extra point. A play event icon may include an icon with arms extended upright to indicate that the corresponding play event is associated with a score, such as a touchdown. A play event icon may include an icon with arms crossed to indicate that the corresponding play event is associated with a personal foul. Additionally or alternatively, a play event icon may include an image, such as a logo, for the team associated with the corresponding play event.

The position of each play event icon in the bar may be based, at least in part, on the location of the corresponding graphical tile in the graphical tile list 405. For example, in FIG. 4B, expanded frame 454 covers play event icons 462 and 464 because corresponding graphical tiles 416 and 418 are currently in view within graphical tile list 405. Similarly, in FIG. 4D, expanded indicator 458 underscores play event icons 462 and 464 because corresponding graphical tiles 416 and 418 are currently in view within graphical tile list 405.

The position of each play event icon in the bar may be based, at least in part, on the starting and/or ending game clock time of the corresponding play event. For purposes of illustrating a clear example, assume that each quarter in a game is fourteen minutes long. As illustrated in graphical tile 418, the game clock starting time is approximately half way through the second quarter. Accordingly, play event icon 464, which corresponds with the same play event that graphical tile 418 corresponds to, is located approximately half the distance between markers 472 and 473, since markers 472 and 473 indicate the beginning of the second quarter and the third quarter, respectively.

A play event icon need not be displayed for all graphical tiles. For example, no play event icon precedes play event icon 464 during the second quarter, but a graphical tile is depicted in FIG. 4B that corresponds to a play event that starts with eight minutes and fifteen seconds left in the second quarter according to the game clock as illustrated in the graphical tile.

A play event icon may be displayed based, at least in part, on the corresponding play event indicating that the play event is marked as, or determined to be, important. For example, a play event may be determined to be important if any of the following are indicated in the play event: a different team has possession of the ball at the end of the play, a team scores, and/or a team has progressed the position of the ball a particular distance. Also for example, a play event may be determined to be important if an "important" field is selected. The "important" field may be selected automatically by an application or device distributing play events or by application 400. Additionally or alternatively, the "important" field may be selected manually by an operator or user, either before or after application 400 receives the play event.

3.4 Markers

In FIG. 4A, FIG. 4B, FIG. 4C, and FIG. 4D, bar 450 includes markers 471, 472, and 473. Markers may indicate particular milestones within a game, such as the beginning of a quarter, period, or overtime. For example, marker 471 marks the beginning of the first quarter of a game. Accordingly, marker 471 is labeled "Q1". Similarly, markers 472 and 473 indicate the beginning of the second quarter and the third quarter, respectively. Markers may also mark particular penalties or other milestones or times within a game. Markers need not be associated with any play event. Additionally or alternatively, markers may be associated with a time or timestamp corresponding to a game clock or other time. Additionally or alternatively, application 400 may display markers within a graphical tile list, such as graphical tile list 405.

The position of the markers in the bar may be based, at least in part, on the play event icons displayed in the bar. For example, marker 472, which indicates the beginning of the second quarter, precedes play event icons 462 and 464 in bar 450, because the play events corresponding to play event icons 462 and 464 take place during the second quarter as indicated in corresponding graphical tiles 416 and 418. Accordingly, marker 473 follows play event icons 462 and 464, since the position of marker 473 indicates the beginning of the third quarter.

The position of the markers in the bar may be based, at least in part, on the game clock or other time. For purposes of illustrating a clear example, assume that the length of the first quarter is the same as the length of the second quarter, at least according to the game clock. Accordingly, marker 471 may be the same distance from marker 472, as marker 472 is from marker 473.

3.5 Frames and Indicators

Frames and indicators may be used to visually indicate which graphical tiles are being displayed. For example, FIG. 4A and FIG. 4B illustrate a linearly movable and expandable frame, FIG. 4A illustrates collapsed frame 452 and FIG. 4B illustrates expanded frame 454. In the embodiment illustrated in FIG. 4A, displaying collapsed frame 452 nearest to the text, "LIVE", indicates that one or more of the present or most current play events, which have been received by application 400, are currently displayed as graphical tiles in graphical tile list 405. In the embodiment illustrated in FIG. 4B, expanded frame 454, which covers play event icons 462 and 464, indicates that corresponding graphical tiles 416 and 418 are currently visible in graphical tile list 405.

Additionally or alternatively, the frame, or a portion of the frame, may be selectable and may be used to scroll through graphical tiles. For example, in FIG. 4A and FIG. 4B, collapsed frame 452 and expanded frame 454 may be selected by a user. According to user input, the collapsed frame 452 and/or expanded frame 454 may move along bar 450. Furthermore, the graphical tiles that correspond with the play event icons covered by either collapsed frame 452 or expanded frame 454 may be visible in graphical tile list 405.

Additionally or alternatively, the graphical tiles listed in graphical tile list 405 may be scrolled through. Accordingly, an indicator in bar 450 may be updated to visually indicate which graphical tiles are currently displayed. For example, FIG. 4C and FIG. 4D illustrate a linearly movable and expandable indicator. FIG. 4C illustrates collapsed indicator 456. FIG. 4D illustrates expanded indicator 458. In the embodiment illustrated in FIG. 4C, displaying collapsed indicator 456 nearest to the text, "LIVE", indicates that one or more of the present or most current play events, which have been received by application 400, are currently displayed as graphical tiles in graphical tile list 405. In the embodiment illustrated in FIG. 4D, expanded indicator 458, which underscores play event icons 462 and 464, indicates that corresponding graphical tiles 416 and 418 are currently visible in graphical tile list 405.

Additionally or alternatively, a marker or scrubber may be used to indicate which graphical tiles may be visible in graphical tile list 405.

3.6 Drive Chart

Figure 5:
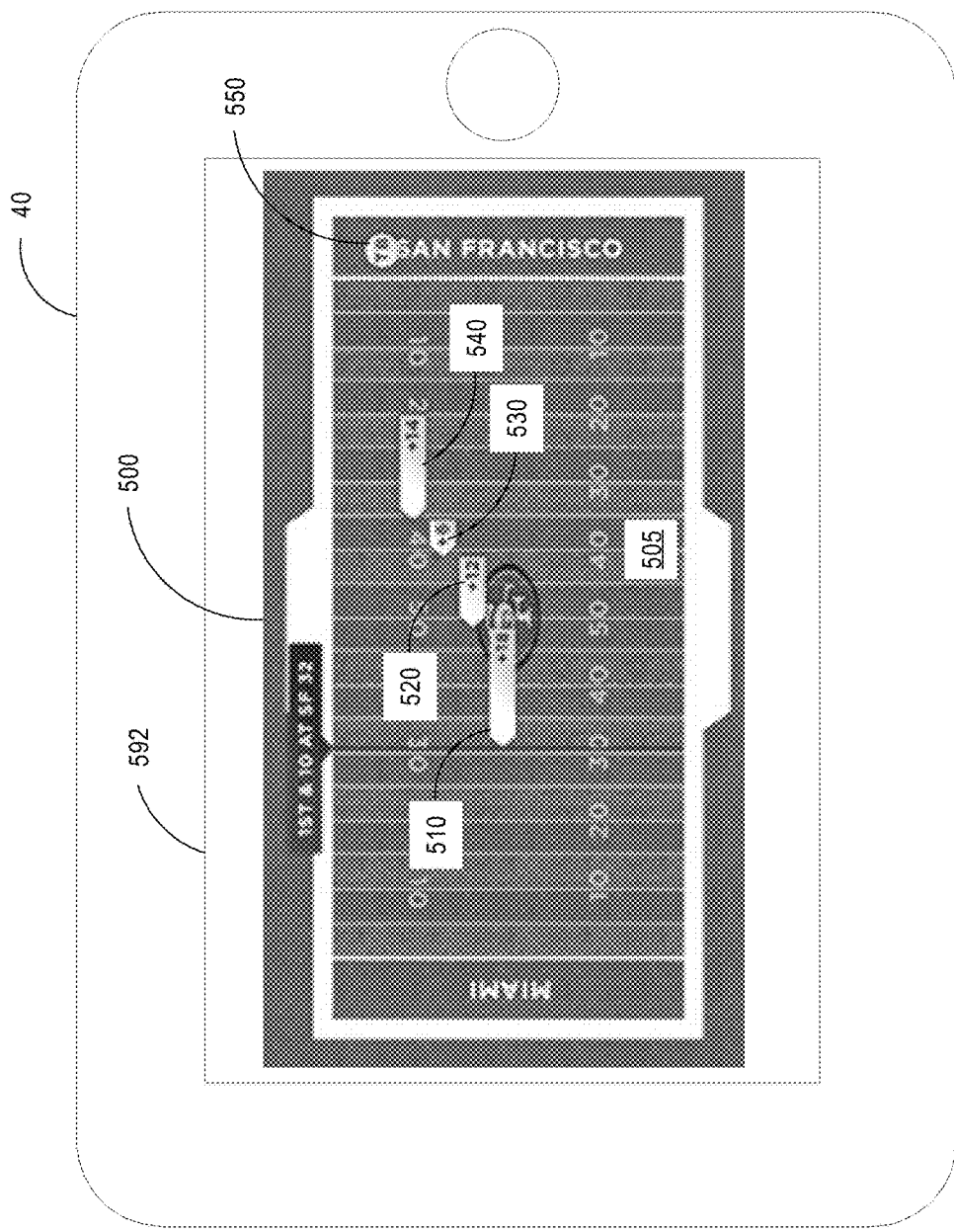
FIG. 5 is a block diagram illustrating a drive chart on an example mobile device 40 of FIG. 1A, in an example embodiment.

FIG. 5 is a block diagram illustrating a drive chart on an example mobile device 40 of FIG. 1A, in an example embodiment. Example mobile device 40 includes touch screen display 592 on which graphical representation 500 of the live sporting event is displayed. In this example, the live sporting event is a professional American football. However, a graphical representation of other live sporting events may be displayed in other embodiments. For example, the graphical representation may be of a soccer game, a basketball game, a baseball game, a hockey game, etc.

Graphical representation 500 includes a representation 505 of the playing area. In this example, playing area representation 505 is of a professional American football field showing the end zones, field boundaries, and yardage markings. A different playing area representation 505 may be displayed for other live sporting events. For example, the playing area representation may be of a soccer field, a basketball court, a baseball field, a hockey rink, etc.

Graphical representation 500 also includes recent play indicators 510 through 550. In this example, the five most recent plays are shown with recent play indicators 510 through 550, each indicator indicating the yardage gained, or lost, by the team currently in possession of the football. In particular, the most recent play is illustrated by play indicator 510 is a gain of 18 yards. The second most recent play, illustrated by play indicator 520, is a gain of twelve yards. The third most recent play, illustrated by play indicator 530, is a gain of six years. The fourth most recent play, illustrated by play indicator 540, is a gain of fourteen yards. And, the fifth most recent play, illustrated by play indicator 550, is a touchback.

In the current example, each of the recent play indicators 510-550 indicates a number of aspects of the corresponding play. In one aspect, each of the recent play indicators 510-550 indicates the location(s) of the play relative to the playing field illustrated in playing area representation 505. For example, recent play indicator 540 indicates that the corresponding play started at the twenty yard line and that the football was advanced to the thirty-four yard line. In another aspect, each of the recent play indicators 510-550 indicates the direction the corresponding play is moving relative to the playing field. For example, recent play indicator 510 indicates that during the corresponding play San Francisco advanced the football toward the Miami end zone. In yet another aspect, each of the recent play indicators 510-550 indicates the amount of the playing field covered by the corresponding play. For example, recent play indicator 530 indicates that the corresponding play covered six yards. Recent play indicators may indicate other play information. For example, recent play indicators may indicate player information (e.g., player name(s) and/or player number(s) involved in the play), timing information (e.g., game time occurrence of the play and/or play time length), touch backs, or scoring plays. Recent play indicators can indicate different play aspects for different types of live sporting events. For example, recent play indicators for a soccer game, basketball, game, or hockey game may indicate that a shot attempt was made, where on the playing field the shot was taken, which player took the shot, and the result of the shot attempt.

Additionally, each of the recent play indicators 510-550 may be a link corresponding to a play event. Accordingly, in response to a user selecting one of recent play indicators 510-550, the application may present the media included or referenced in the corresponding play event.

3.7 Application

Application 400 may also be an application running on a computing device such as one of the mobile devices 40 of FIG. 1A. For example, application 400 may be a mobile application running on a mobile device, such as a mobile phone or tablet. Application 400 may also be an application running on a desktop or laptop computer.

Application 400 may be restricted, such that one or more features may be performed during select times and/or places. For example, application 400 may be configured to perform during a particular game, and may be configured to terminate performance of one or more features after the game has finished. Also for example, application 400 may be configured to perform one or more features while the device, which application 400 is running on, is within a particular distance from the location that the game is, or was, being played at, and to terminate performance of the one or more features otherwise.

4.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
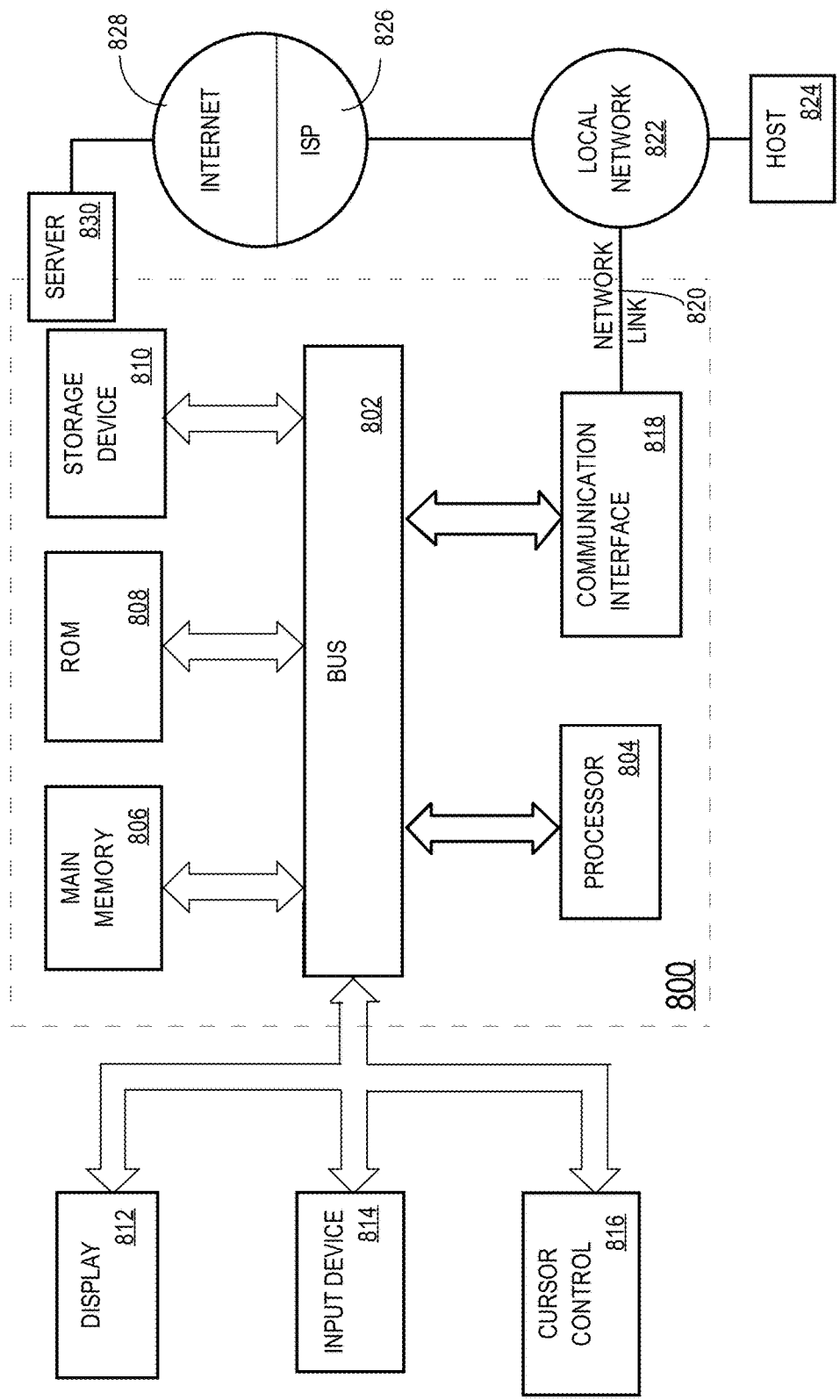
FIG. 8 illustrates a computer system upon which an embodiment may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   receiving digital data representing a plurality of play events associated with a live sporting event, wherein each play event of the plurality of play events comprises a game clock time, a description, and identifies a sports team of a plurality of sports teams, wherein each of the plurality of play events is independently and sequentially received from one or more server computers in real time as the live sporting event is played, wherein each of the plurality of play events represents one or more plays;

for one or more play events in the plurality of play events:
generating, in real time as the live sporting event is played and responsive to receiving the play event, a graphical tile that is associated with the play event; and
configuring an appearance of the graphical tile based, at least in part, on the description and the sports team of the play event;

generating a super graphical tile that summarizes a plurality of portions of the live sporting event and includes, nested within the super graphical tile, a first graphical tile that corresponds to a first portion of the live sporting event and a second graphical tile that corresponds to a second portion of the live sporting event;

automatically causing to append said super graphical tile to the display of a graphical tile list in a graphical user interface of a mobile computing device, wherein:
before said generating said super graphical tile and after said causing to append, the graphical tile list includes a same one or more of the graphical tiles listed in an order determined based on the game clock time in the play event associated with each graphical tile including a particular graphical tile, and
the one or more graphical tiles include the super graphical tile;

generating a scroll bar in the display that comprises one or more graphical icons each representing different play events of the live sporting event in real time as the live sporting event is played, the one or more graphical icons spaced apart in the scroll bar in proportion to times at which corresponding play events occurred in relation to a game clock and an elapsed time duration of the live sporting event that the scroll bar represents as a whole, the scroll bar having a selectable indicator that may be expanded or collapsed, wherein the selectable indicator may be used to scroll through the graphical tiles and to visually indicate which portion of the elapsed time duration of the live sporting event corresponds to graphical tiles that are visible, wherein each of the one or more graphical tiles represents more plays when the selectable indicator is expanded than when collapsed;

in response to receiving one or more new play events of the plurality of play events in real time as the live sporting event is played, updating linear positions of the one or more graphical icons;

wherein whether a particular play event of the plurality of play events contains an importance indicator that indicates an important play determines at least one of:
whether or not to perform generating a particular graphical tile that is associated with the particular play event, or
a particular appearance of an icon on at least one of: the particular graphical tile or the scroll bar;

wherein the method is performed by one or more computing devices.

2. The method of claim 1 comprising:
associating each play event of the plurality of play events with an event type;
for each play event in the plurality of play events:
determining an icon based, at least in part, on the event type that is associated with the play event;
displaying the icon in the graphical tile associated with the play event.

3. The method of claim 1 comprising:
associating each play event of the plurality of play events with a media type;
for each play event in the plurality of play events associated with at least a particular media type:
determining an icon based, at least in part, on the media type that is associated with the play event;
displaying the icon in the graphical tile associated with the play event.

4. The method of claim 1 comprising:
receiving a selection of a particular team;
in response to receiving the selection:
filtering the plurality of play events to include only play events of the particular team;
causing to display at least one graphical tile associated with at least one play event in the plurality of play events that is associated with the particular team;
causing not displaying each graphical tile associated with each play event in the plurality of play events that is not associated with the particular team.

5. The method of claim 1 comprising:
associating each play event of the plurality of play events with an event type;
receiving a selection for a particular event type;
in response to receiving the selection:
filtering the plurality of play events to include only play events of the event type;
causing to display at least one graphical tile associated with at least one play event in the plurality of play events that is associated with the particular event type;
causing not displaying each graphical tile associated with each play event in the plurality of play events that is not associated with the particular event type.

6. The method of claim 1 comprising:
receiving a new play event comprising a new game clock time and identifying a sports team of the plurality of sports teams;
generating a new graphical tile for the new play event;
customizing the new graphical tile based, at least in part, on the sports team of the new play event;
causing to display the new graphical tile in the graphical tile list in a position based, at least in part, on the new game clock time.

7. The method of claim 1, wherein the graphical tile list is a scrollable list of graphical tiles, the method comprising:
for each play event in a subset of the plurality of play events, associating with the play event with a particular graphical icon from among the one or more graphical icons based, at least in part, on the sports team of the play event;
causing to display a scroll bar adjacent to the scrollable list of graphical tiles, wherein the scroll bar represents at least a portion of a time duration of the live sporting event;
for each play event in the subset of the plurality of play events, causing to display the particular graphical icon, at a particular linear position, in the scroll bar, wherein the particular linear position is based, at least in part, on the game clock time of the play event.

8. The method of claim 1, wherein each play event of the plurality of play events represents one or more plays in the live sporting event and includes a description of the one or more plays, and comprising configuring the appearance of the graphical tile using the description in the play event associated with the graphical tile.

9. The method of claim 1, wherein a particular graphical tile represents a drive of an American football game and comprising a plurality of plays, and upon receiving a selection for the particular graphical tile, causing to display a drive chart illustrating a forward progress of each play in the plurality of plays.

10. The method of claim 1 comprising:
causing to display a particular graphical tile that is associated with a particular play event and indicates a particular direction;
wherein the particular play event represents a drive in an American football game, and comprises a plurality of play events;
wherein each play event in the plurality of play events represents a down that is part of the drive;
receiving a first selection selecting the particular graphical tile;
in response to receiving the first selection, causing to display a plurality of graphical tiles, each of which is associated with a play event in the plurality of play events;
receiving a second selection selecting a second graphical tile of the plurality of graphical tiles;
in response to receiving the second selection, causing to display recorded media content contained or referenced in the play event associated with the second graphical tile.

11. The method of claim 1 wherein a particular graphical tile is associated with a particular play event that represents a play recorded from a plurality of camera angles, the method comprising:
receiving a first selection selecting the particular graphical tile;
in response to receiving the first selection, causing to display a plurality of graphical tiles, wherein each of the plurality of graphical tiles is associated with a single camera angle of the plurality of camera angles of the play;
receiving a second selection selecting a second graphical tile of the plurality of graphical tiles;
in response to receiving the second selection, causing to display the play recorded from the single camera angle associated with the second graphical tile.

12. The method of claim 1 wherein listing the one or more graphical tiles in the order comprises displaying a first graphical tile above a second graphical tile;
the method comprising determining the order based on a first game clock time associated with the first graphical tile and a second game clock time associated with the second graphical tile, the first game clock time and the second game clock time indicating that a first play event associated with the first graphical tile occurred before a second play event associated with the second graphical tile.

13. The method of claim 1 comprising:
receiving a selection of a particular filter criteria, wherein the particular filter criteria identifies a particular media format;
in response to receiving the selection of the particular filter criteria, filtering the graphical tile list by causing removal of a particular graphical tile based on a determination that the particular graphical tile does not correspond to media of the particular media format.

14. The method of claim 1 comprising:
receiving a selection of a certain graphical tile, and in response to receiving the selection of the certain graphical tile: causing an adjustment to a size of the certain graphical tile; and causing, to display inside the certain graphical tile, video coverage of the live sporting event that corresponds to the certain graphical tile or controls to the video coverage.

15. One or more non-transitory computer-readable media storing one or more sequences of instructions which, when executed by one or more computing devices, cause:
receiving digital data representing a plurality of play events associated with a live sporting event, wherein each play event of the plurality of play events comprises a game clock time, a description, and identifies a sports team of a plurality of sports teams, wherein each of the plurality of play events is independently and sequentially received from one or more server computers in real time as the live sporting event is played, wherein each of the plurality of play events represents one or more plays;
for one or more play events in the plurality of play events:
generating, in real time as the live sporting event is played and responsive to receiving the play event, a graphical tile that is associated with the play event; and
configuring an appearance of the graphical tile based, at least in part, on the description and the sports team of the play event;
generating a super graphical tile that summarizes a plurality of portions of the live sporting event and includes, nested within the super graphical tile, a first graphical tile that corresponds to a first portion of the live sporting event and a second graphical tile that corresponds to a second portion of the live sporting event;
automatically appending said super graphical tile to the display of a graphical tile list in a graphical user interface of a mobile computing device, wherein:
before said generating said super graphical tile and after said appending, the graphical tile list includes a same one or more of the graphical tiles listed in an order determined based on the game clock time in the play event associated with each graphical tile including a particular graphical tile, and
the one or more graphical tiles include the super graphical tile;
generating a scroll bar in the display that comprises one or more graphical icons each representing different play events of the live sporting event in real time as the live sporting event is played, the one or more graphical icons spaced apart in the scroll bar in proportion to times at which corresponding play events occurred in relation to a game clock and an elapsed time duration of the live sporting event that the scroll bar represents as a whole, the scroll bar having a selectable indicator that may be expanded or collapsed, wherein the selectable indicator may be used to scroll through the graphical tiles and to visually indicate which portion of the elapsed time duration of the live sporting event corresponds to graphical tiles that are visible, wherein each of the one or more graphical tiles represents more plays when the selectable indicator is expanded than when collapsed;
in response to receiving one or more new play events of the plurality of play events in real time as the live sporting event is played, updating linear positions of the one or more graphical icons;
wherein whether a particular play event of the plurality of play events contains an importance indicator that indicates an important play determines at least one of:
whether or not to perform generating a particular graphical tile that is associated with the particular play event, or
a particular appearance of an icon on at least one of: the particular graphical tile or the scroll bar.

16. The one or more non-transitory computer-readable media of claim 15, comprising instructions which when executed cause:
associating each play event of the plurality of play events with an event type;
for each play event in the plurality of play events:
determining an icon based, at least in part, on the event type that is associated with the play event;
displaying the icon in the graphical tile associated with the play event.

17. The one or more non-transitory computer-readable media of claim 15, comprising instructions which when executed cause:
associating each play event of the plurality of play events with a media type;
for each play event in the plurality of play events associated with at least a particular media type:
determining an icon based, at least in part, on the media type that is associated with the play event;
displaying the icon in the graphical tile associated with the play event.

18. The one or more non-transitory computer-readable media of claim 15, comprising instructions which when executed cause:
receiving a selection of a particular team;
in response to receiving the selection:
filtering the plurality of play events to include only play events of the particular team;
causing to display at least one graphical tile associated with at least one play event in the plurality of play events that is associated with the particular team;
causing not displaying each graphical tile associated with each play event in the plurality of play events that is not associated with the particular team.

19. The one or more non-transitory computer-readable media of claim 15, comprising instructions which when executed cause:
associating each play event of the plurality of play events with an event type;
receiving a selection for a particular event type;
in response to receiving the selection:
filtering the plurality of play events to include only play events of the event type;
causing to display at least one graphical tile associated with at least one play event in the plurality of play events that is associated with the particular event type;
causing not displaying each graphical tile associated with each play event in the plurality of play events that is not associated with the particular event type.

20. The one or more non-transitory computer-readable media of claim 15, comprising instructions which when executed cause:
receiving a new play event comprising a new game clock time and identifying a sports team of the plurality of sports teams;
generating a new graphical tile for the new play event;
customizing the new graphical tile based, at least in part, on the sports team of the new play event;
causing to display the new graphical tile in the graphical tile list in a position based, at least in part, on the new game clock time.

21. The one or more non-transitory computer-readable media of claim 15, wherein the graphical tile list is a scrollable list of graphical tiles, and comprising instructions which when executed cause:
for each play event in a subset of the plurality of play events, associating with the play event with a particular graphical icon from among the one or more graphical icons based, at least in part, on the sports team of the play event;
displaying a scroll bar adjacent to the scrollable list of graphical tiles, wherein the scroll bar represents at least a portion of a time duration of the live sporting event;
for each play event in the subset of the plurality of play events, displaying the particular graphical icon, at a particular linear position, in the scroll bar, wherein the particular linear position is based, at least in part, on the game clock time of the play event.

22. The one or more non-transitory computer-readable media of claim 15, wherein each play event of the plurality of play events represents one or more plays in the live sporting event and includes a description of the one or more plays, and comprising instructions which when executed cause configuring the appearance of the graphical tile using the description in the play event associated with the graphical tile.

23. The one or more non-transitory computer-readable media of claim 15, wherein a particular graphical tile represents a drive of an American football game and comprising a plurality of plays, and comprising instructions which when executed cause, upon receiving a selection for the particular graphical tile, displaying a drive chart illustrating a forward progress of each play in the plurality of plays.

24. The one or more non-transitory computer-readable media of claim 15, comprising instructions which when executed cause:
displaying a particular graphical tile that is associated with a particular play event and indicates a particular direction;
wherein the particular play event represents a drive in an American football game, and comprises a plurality of play events;
wherein each play event in the plurality of play events represents a down that is part of the drive;
receiving a first selection selecting the particular graphical tile;
in response to receiving the first selection, displaying a plurality of graphical tiles, each of which is associated with a play event in the plurality of play events;
receiving a second selection selecting a second graphical tile of the plurality of graphical tiles;
in response to receiving the second selection, displaying recorded media content contained or referenced in the play event associated with the second graphical tile.

25. The one or more non-transitory computer-readable media of claim 15, wherein a particular graphical tile is associated with a particular play event that represents a play recorded from a plurality of camera angles, and comprising instructions which when executed cause:
receiving a first selection selecting the particular graphical tile;

in response to receiving the first selection, displaying a plurality of graphical tiles, wherein each of the plurality of graphical tiles is associated with a single camera angle of the plurality of camera angles of the play;

receiving a second selection selecting a second graphical tile of the plurality of graphical tiles;

in response to receiving the second selection, displaying the play recorded from the single camera angle associated with the second graphical tile.

26. The one or more non-transitory computer-readable media of claim 15 wherein listing the one or more graphical tiles in the order comprises displaying a first graphical tile above a second graphical tile;

wherein the instructions which when executed further cause determining the order based on a first game clock time associated with the first graphical tile and a second game clock time associated with the second graphical tile, the first game clock time and the second game clock time indicating that a first play event associated with the first graphical tile occurred before a second play event associated with the second graphical tile.

27. The one or more non-transitory computer-readable media of claim 15, comprising instructions which when executed cause:

receiving a selection of a particular filter criteria, wherein the particular filter criteria identifies a particular media format;

in response to receiving the selection of the particular filter criteria, filtering the graphical tile list by causing removal of a particular graphical tile based on a determination that the particular graphical tile does not correspond to media of the particular media format.

28. The one or more non-transitory computer-readable media of claim 15, comprising instructions which when executed cause:

receiving a selection of a certain graphical tile, and in response to receiving the selection of the certain graphical tile: adjusting a size of the certain graphical tile;

and displaying, inside the certain graphical tile, video coverage of the live sporting event that corresponds to the certain graphical tile or controls to the video coverage.

* * * * *